(12) United States Patent
Takeuchi et al.

(10) Patent No.: US 7,830,808 B2
(45) Date of Patent: Nov. 9, 2010

(54) PATH STATUS MONITORING METHOD AND DEVICE

(75) Inventors: Osamu Takeuchi, Kawasaki (JP); Yoshitaka Taki, Kawasaki (JP); Satoru Saitoh, Kawasaki (JP); Hiroyuki Honma, Kawasaki (JP); Tomoyoshi Fujimori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 253 days.

(21) Appl. No.: 12/005,608

(22) Filed: Dec. 28, 2007

(65) Prior Publication Data

US 2008/0159156 A1    Jul. 3, 2008

(30) Foreign Application Priority Data

Dec. 28, 2006    (JP) .............................. 2006-354665

(51) Int. Cl.
*G01R 31/08* (2006.01)
(52) U.S. Cl. ...................................................... 370/248
(58) Field of Classification Search ................. 370/248, 370/301, 376, 314
See application file for complete search history.

(56) References Cited

U.S. PATENT DOCUMENTS

| | | | | |
|---|---|---|---|---|
| 5,862,136 A * | 1/1999 | Irwin | 370/395.4 |
| 5,878,039 A * | 3/1999 | Gorshe et al. | 370/376 |
| 5,978,384 A * | 11/1999 | Kotchey | 370/445 |
| 6,115,357 A * | 9/2000 | Packer et al. | 370/231 |
| 6,208,654 B1 * | 3/2001 | Moteki et al. | 370/395.2 |
| 6,381,243 B1 * | 4/2002 | Ekstedt | 370/395.62 |
| 6,788,689 B1 * | 9/2004 | Turner et al. | 370/395.4 |
| 7,012,889 B1 * | 3/2006 | Turner et al. | 370/229 |
| 7,050,399 B2 * | 5/2006 | Masuda | 370/245 |
| 7,106,693 B1 * | 9/2006 | Turner et al. | 370/230 |
| 7,200,157 B1 * | 4/2007 | Hessler et al. | 370/509 |
| 7,301,941 B2 * | 11/2007 | Dally | 370/374 |
| 7,430,176 B2 * | 9/2008 | Nalawade et al. | 370/238 |
| 7,433,340 B1 * | 10/2008 | Proctor, Jr. | 370/336 |
| 7,558,479 B1 * | 7/2009 | Robinson | 398/28 |
| 7,590,046 B1 * | 9/2009 | Bhate et al. | 370/216 |
| 2005/0099941 A1 * | 5/2005 | Sestito et al. | 370/228 |
| 2005/0147106 A1 * | 7/2005 | Sonoda | 370/395.51 |
| 2005/0201277 A1 * | 9/2005 | Ohnuma | 370/227 |

(Continued)

FOREIGN PATENT DOCUMENTS

JP    2002-232380    8/2002

(Continued)

*Primary Examiner*—Kwang B Yao
*Assistant Examiner*—Jung Liu
(74) *Attorney, Agent, or Firm*—Staas & Halsey LLP

(57) ABSTRACT

In a path status monitoring method and device which can enhance or reduce a band more rapidly, for example, SONET frames FR serially connected over 32 frames to which frame Nos. FN ("0"-"31")) are assigned are cyclically generated respectively for paths P0-P2 in a cycle $T_C$ (=64 ms). After output timing delays $T_D0$-$T_D2$ of the frames FR are shifted by an optimal delay interval D (=21 ms) between the paths P0-P2 based on the number of the paths "3", the output timing delays $T_D1$ and $T_D2$ are restored by preliminarily obtained transmission delays for the paths P1 and P2 to the path P0. When the frames FR are transmitted through each of the paths P0-P2, statuses (path statuses MST) where a reception fault has occurred in each of the paths P0-P2 are collected to be stored in the frame whose frame No. FN="0".

7 Claims, 32 Drawing Sheets

U.S. PATENT DOCUMENTS

2006/0159112 A1* 7/2006 Sundaram et al. ........... 370/412
2006/0222005 A1* 10/2006 Gorshe et al. .............. 370/466
2007/0036181 A1 2/2007 Nagasawa
2007/0253451 A1* 11/2007 Koob et al. ................ 370/508
2008/0037581 A1* 2/2008 Asano ....................... 370/466
2008/0232818 A1* 9/2008 Narita et al. ............... 398/164
2009/0059958 A1* 3/2009 Nakata ...................... 370/474

FOREIGN PATENT DOCUMENTS

JP 2007-49383 2/2007

* cited by examiner

FIG.12

| BIT 1 | BIT 2 | BIT 3 | BIT 4 | BIT 5 | BIT 6 | BIT 7 | BIT 8 | (DECIMAL NOTATION) |
|---|---|---|---|---|---|---|---|---|
| H4 BYTE ||||||||||
| DATA AREA (BITS 1–4) |||| MULTI-FRAME INDICATOR MFI (BITS 5–8) |||| |
| FRAME NO. FN |||| 0 | 0 | 0 | 0 | 0 |
| ^ |||| 0 | 0 | 0 | 1 | 1 |
| PATH USE MODE CONTROL INFORMATION CTRL |||| 0 | 0 | 1 | 0 | 2 |
| 0 | 0 | 0 | GID | 0 | 0 | 1 | 1 | 3 |
| Reserved ("0000") |||| 0 | 1 | 0 | 0 | 4 |
| Reserved ("0000") |||| 0 | 1 | 0 | 1 | 5 |
| CRC |||| 0 | 1 | 1 | 0 | 6 |
| CRC |||| 0 | 1 | 1 | 1 | 7 |
| PATH STATUS (FOR 8 PATHS) MST |||| 1 | 0 | 0 | 0 | 8 |
| (OK:0, FAULT:1) |||| 1 | 0 | 0 | 1 | 9 |
| 0 | 0 | 0 | RS-Ack | 1 | 0 | 1 | 0 | 10 |
| TRANSMISSION NO. TN |||| 1 | 0 | 1 | 1 | 11 |
| ^ |||| 1 | 1 | 0 | 0 | 12 |
| ^ |||| 1 | 1 | 0 | 1 | 13 |
| PATH NO. PN |||| 1 | 1 | 1 | 0 | 14 |
| ^ |||| 1 | 1 | 1 | 1 | 15 |

| TRANSMISSION DELAY $T_P$ | F2 BYTE (8 BITS) |
|---|---|
| 0.0ms | 00000000 |
| 0.5ms | 00000001 |
| 1.0ms | 00000010 |
| 1.5ms | 00000011 |
| ⋮ | ⋮ |

| F2 BYTE | | |
|---|---|---|
| MULTI-FRAME INDICATOR (4 BITS) | (DECIMAL NOTATION) | DATA AREA (4 BITS) |
| 0000 | 0 | Reserved |
| 0001 | 1 | Reserved |
| 0010 | 2 | Reserved |
| 0011 | 3 | Reserved |
| 0100 | 4 | PATH NO. PN (MSB) |
| 0101 | 5 | PN (LSB) |
| 0110 | 6 | Reserved |
| 0111 | 7 | Reserved |
| 1000 | 8 | Reserved |
| 1001 | 9 | Reserved |
| 1010 | 10 | TRANSMISSION DELAY $T_P$ (MSB) |
| 1011 | 11 | ⋮ |
| 1100 | 12 | ⋮ |
| 1101 | 13 | $T_P$ (LSB) |
| 1110 | 14 | CRC |
| 1111 | 15 | CRC |

STS-1 LINE (49.536Mbps)

DT
Ethernet DATA (10Mbps)

STS-3c LINE (149.76Mbps)

DT (100Mbps)

STS-48c LINE (2396.16Mbps)

DT (1000Mbps)

| FRAME NO. FN | PATH STATUS MST | | | | DESCRIPTION |
|---|---|---|---|---|---|
| 0 | 0 | 1 | 2 | 3 | STATUSES MST0–MST2 OF EXISTING PATHS P0–P2 ("OK"/ "FAULT") |
| | 4 | 5 | 6 | 7 | STATUSES MST3–MST7 OF NON-EXISTING PATHS P3–P7 (CONSTANTLY "FAULT") |
| 1 | 8 | 9 | 10 | 11 | STATUSES MST8–MST15 OF NON-EXISTING PATHS P8–P15 (CONSTANTLY "FAULT") |
| | 12 | 13 | 14 | 15 | |
| ⋮ | ⋮ | ⋮ | ⋮ | ⋮ | ⋮ |
| 30 | 240 | 241 | 242 | 243 | STATUSES MST240–MST247 OF NON-EXISTING PATHS P240–P247 (CONSTANTLY "FAULT") |
| | 244 | 245 | 246 | 247 | |
| 31 | 248 | 249 | 250 | 251 | STATUSES MST248–MST255 OF NON-EXISTING PATHS P248–P255 (CONSTANTLY "FAULT") |
| | 252 | 253 | 254 | 255 | |

FIG.32

PRIOR ART

| H4 BYTE |||||||||
|---|---|---|---|---|---|---|---|---|
| BIT 1 | BIT 2 | BIT 3 | BIT 4 | BIT 5 | BIT 6 | BIT 7 | BIT 8 | (DECIMAL NOTATION) |
| DATA AREA (BITS 1−4) |||| MULTI-FRAME INDICATOR MFI (BITS 5−8) |||||
| FRAME NO. FN |||| 0 | 0 | 0 | 0 | 0 |
| ^ |||| 0 | 0 | 0 | 1 | 1 |
| PATH USE MODE CONTROL INFORMATION CTRL |||| 0 | 0 | 1 | 0 | 2 |
| 0 | 0 | 0 | GID | 0 | 0 | 1 | 1 | 3 |
| Reserved ("0000") |||| 0 | 1 | 0 | 0 | 4 |
| Reserved ("0000") |||| 0 | 1 | 0 | 1 | 5 |
| CRC |||| 0 | 1 | 1 | 0 | 6 |
| CRC |||| 0 | 1 | 1 | 1 | 7 |
| PATH STATUS (FOR 8 PATHS) MST |||| 1 | 0 | 0 | 0 | 8 |
| (OK:0, FAULT:1) |||| 1 | 0 | 0 | 1 | 9 |
| 0 | 0 | 0 | RS-Ack | 1 | 0 | 1 | 0 | 10 |
| Reserved ("0000") |||| 1 | 0 | 1 | 1 | 11 |
| Reserved ("0000") |||| 1 | 1 | 0 | 0 | 12 |
| Reserved ("0000") |||| 1 | 1 | 0 | 1 | 13 |
| PATH NO. PN |||| 1 | 1 | 1 | 0 | 14 |
| ^ |||| 1 | 1 | 1 | 1 | 15 |

PATH STATUS MONITORING METHOD AND DEVICE

BACKGROUND OF THE INVENTION

1. Field of the Invention

The present invention relates to a path status monitoring method and device, and in particular to a method and device for monitoring signal reception faults which occur in parallel physical paths.

2. Description of the Related Art

The above-mentioned path status monitoring technology is applied to an EoS (Ethernet Over SONET) where Ethernet (registered trademark) data is transmitted to a SONET network, or the like.

Hereinafter, general transmission examples [1] and [2] of the EoS to which the path status monitoring technology is not applied will be firstly described referring to FIGS. 24A-25. Then, a transmission example of the EoS to which a prior art path status monitoring technology is applied will be described referring to FIGS. 26A-32.

General Transmission Example [1] of EoS (CCAT): FIGS. 24A-24C

SONET employs a contiguous concatenation (CCAT) container (hereinafter, referred to as STS line or merely path), prescribing an STS-1 as a basis where an SPE (Synchronous Payload Envelope) is "49.536 Mbps", an STS-3c (SPE="149.76 Mbps"), an STS-12c (SPE="599.04 Mbps"), an STS-48c (SPE="2396.16 Mbps"), an STS-192c (SPE="9584.64 Mbps"), and the like, so that a transmission in a broad bandwidth is realized.

For example, in a case where a transmission rate of the Ethernet data DT is "10 Mbps" as shown in FIG. 24A, the data DT is transmitted to the SONET network by using an STS-1 line whose transmission rate is higher than that of the data DT. Similarly, an STS-3c line is used in a case where the transmission rate of the Ethernet data DT is "100 Mbps" as shown in FIG. 24B, and an STS-48c line is used in a case where the transmission rate of the Ethernet data DT is "1000 Mbps" as shown in FIG. 24C.

However, in these cases, the transmission rate of the STS line is considerably higher than the actual transmission rate. Accordingly, it has been disadvantageous that the STS line can not be efficiently used.

As a technology to address this problem, a VCAT (Virtual Concatenation) has been already proposed (see e.g. non-patent document 1), which will be described hereinbelow.

General Transmission Example [2] of EoS (VCAT): FIG. 25

In the VCAT, the Ethernet data DT are transmitted in parallel by using a plurality of STS lines respectively having transmission rates lower than those of the Ethernet data DT.

Namely, as shown in FIG. 25 for example, a transmission device 1_1 having received the Ethernet data DT through an Ethernet line EL1 from the precedent Ethernet network (not shown) divides the data DT into SONET frames FR to be transmitted to the SONET network through physical paths P0-Pn-1 which are formed of "n" pieces of STS lines. In FIG. 25, "STSx-nV" indicates that "n" pieces of STS lines having transmission rates lower than those of the Ethernet data DT are used. For example, in a case where the transmission rate of the Ethernet data DT is "1000 Mbps", "24" pieces of STS-1 lines (STS1-24V) are used or "8" pieces of STS-3c lines (STS3c-8V) are used.

A transmission device 1_2 having received the SONET frames FR through the paths P0-Pn-1 from the SONET network assembles the original Ethernet data DT from the frames FR and transmits the Ethernet data DT assembled to the subsequent Ethernet network (not shown) through an Ethernet line EL2.

Thus, it is made possible to efficiently transmit the Ethernet data by combining in parallel and operating the STS lines whose transmission rates are lower.

However, when a band (frequency bandwidth) is enhanced or reduced in the VCAT (namely, when the number of operating paths is enhanced or reduced), there has been a problem that band settings of the transmission devices 1_1 and 1_2 have to be changed after all of the paths have been once made a communication disconnected state. Also, even when a reception fault of the SONET frames FR has occurred in a certain path on the transmission device 1_2 side, the transmission device 1_1 continues to transmit the frames FR through the path. Accordingly, there has been another problem that the Ethernet data DT assembled at the transmission device 1_2 results in abnormal data.

As a technology to address these problems, an LCAS (Link Capacity Adjustment Scheme) has been already proposed (see e.g. non-patent document 2), which will be described hereinbelow.

Transmission Example of EoS where Prior Art Path Status Monitoring Technology is Applied (LCAS): FIGS. 26A-32

In the LCAS, the enhancement or reduction of the band can be performed without causing the communication disconnected state and with minimizing the occurrence of the abnormal data as will be described in the following control examples (1)-(4):

LCAS Control Example (1) (Band Enhancement): FIGS. 26A, 26B, and 27

When the number of operating paths is added as shown in FIG. 26B in a state where communications are being performed with the paths P0-Pn-1 used as the operating paths between the transmission devices 1_1 and 1_2 as shown in FIG. 26A, the transmission device 1_1 firstly refers to a path status MST received from the transmission device 1_2 as shown by the solid lines in FIG. 27, and determines whether or not the reception fault has occurred in a path Pn desired to be switched over to the operating state on the transmission device 1_2 side.

In the path status MST, "OK" is set for the path where no reception fault has occurred and "FAULT" is set for the path where a reception fault has occurred.

When the above-mentioned determination results in that no reception fault has occurred in the path Pn, the transmission device 1_1 sets an additional operation request ("ADD") for the path Pn in path use mode control information CTRL shown in FIG. 27 to be transmitted to the transmission device 1_2.

In addition to the above-mentioned "ADD", contents which will be described hereinbelow can be set in the path use mode control information CTRL.

IDLE: The path Pn is in a non-operating state.

NORM: The transmission is normally performed in the path Pn.

DNU: An operation stop request for the path Pn.

EOS: The path Pn is the final path within a group.

FIXED: No control by the LCAS is performed.

The transmission device 1_2 transmits a response RS_Ack to the additional operation request "ADD" to the transmission device 1_1 as shown in FIG. 27 after having completed preparing the reception from the path Pn.

The transmission device 1_1 having received the response also transmits the SONET frames FR to the path Pn as shown by long and short dashed lines in FIG. 26B in addition to the paths P0-Pn-1.

Thus, the band can be enhanced without affecting at all the paths P0-Pn-1 except the path Pn to be switched over to the operating state.

LCAS Control Example (2) (Band Reduction): FIGS. 28A and 28B

When the number of operating paths is reduced as shown in FIG. 28B in a state where communications are being performed with the paths P0-Pn-1 used as the operating paths between the transmission devices 1_1 and 1_2 as shown in FIG. 28A, the transmission device 1_1 firstly stops the transmission of the SONET frames FR to the path Pn-1 desired to be switched over to the non-operating state. Concurrently, the transmission device 1_1 sets the above-mentioned operation stop request "DNU" for the path Pn-1 in the path use mode control information CTRL to be transmitted to the transmission device 1_2.

The transmission device 1_2 transmits the response RS_Ack to the operation stop request "DNU" to the transmission device 1_1 after having completed stopping the reception from the path Pn-1.

The transmission device 1_1 having received the response switches the path Pn-1 over to the non-operating state as shown by long and short dashed lines in FIG. 28B.

Thus, the band can be reduced without affecting at all the paths P0-Pn-2 except the path Pn-1 to be switched over to the non-operating state.

LCAS Control Example (3) (Upon Occurrence of Reception Fault): FIGS. 29A and 29B As shown in FIG. 29A, when reception faults have occurred in e.g. the paths P1 and P2 among the paths P0-Pn-1 in operation in the transmission device 1_2, the transmission device 1_1 firstly detects that reception faults have occurred in the paths P1 and P2 based on the path status MST having been received from the transmission device 1_2, and stops transmitting the SONET frames FR to the paths P1 and P2. Concurrently, the transmission device 1_1 sets the operation stop request "DNU" for the paths P1 and P2 to the path use mode control information CTRL to be transmitted to the transmission device 1_2.

The transmission device 1_2 transmits the response RS_Ack to the operation stop request "DNU" to the transmission device 1_1 after having completed stopping the reception from the paths P1 and P2.

The transmission device 1_1 having received the response switches the paths P1 and P2 over to the non-operating state as shown by long and short dashed lines in FIG. 29B.

Thus, the abnormal data which occurs due to the reception faults of the paths P1 and P2 can be minimized.

LCAS Control Example (4) (Upon Recovery of Reception Fault): FIGS. 30A and 30B As shown in FIG. 30A, when the reception faults of the paths P1 and P2 in the transmission device 1_2 shown in FIG. 29A have recovered, the transmission device 1_1 firstly detects from the path status MST having been received from the transmission device 1_2, that the reception faults of the paths P1 and P2 have recovered and sets the additional operation request "ADD" for the paths P1 and P2 in the path use mode control information CTRL to be transmitted to the transmission device 1_2.

The transmission device 1_2 transmits the response RS_Ack to the additional operation request "ADD" to the transmission device 1_1 after having completed preparing the reception from the paths P1 and P2.

The transmission device 1_1 having received the response switches the paths P1 and P2 over to the operating state again as shown in FIG. 30B, and transmits the SONET frames FR to the paths P1 and P2.

In the above-mentioned control examples (1)-(4), while the transmission devices 1_1 and 1_2 are respectively described as being on the receiving side of the path status MST and the transmitting side of the path status MST, the transmission and reception of the path status MST where the receiving side and transmitting side are reversed are similarly executed. Namely, the path status MST is monitored mutually between the transmission devices 1_1 and 1_2.

Hereinafter, a prior art example of the path status monitoring will be described in more detail, referring to FIGS. 31A, 31B, and 32.

Prior Art Example of Path Status Monitoring: FIGS. 31A, 31B, and 32

As shown in FIG. 31A, a transmission device 1S transmitting the path status MST cyclically generates the SONET frames FR which are serially connected over 32 frames and to which frame Nos. FN ("0"-"31") are respectively assigned in a cycle Tc (="64 ms"), and transmits the frames FR to paths P0-P2 with the same phases (transmission cycle per frame="2 ms").

In the specification of LCAS, it is prescribed that path statuses MST for an operation upper limit number (="256") are transmitted and received between the transmission devices 1S and 1R regardless of the number of actually existing paths. In each of the SONET frames FR, the path statuses MST for 8 paths are set according to the associated relationship between the frame Nos. FN and the path statuses MST as shown in FIG. 31B.

Namely, in the SONET frame FR whose frame No. FN is "0", path statuses MST0-MST7 of the existing paths P0-P2 and non-existing paths P3-P7 are set. In the SONET frames FR whose frame Nos. FN are "1", . . . , "30", and "31", path statuses MST8-15 of non-existing paths P8-P15, . . . , path statuses MST240-247 of non-existing paths P240-P247, and path statuses MST248-255 of non-existing paths P248-P255 are respectively set.

Also, the transmission device 1S sets "OK" or "FAULT" to the path statuses MST0-MST2 according to the statuses where the reception faults have occurred in the paths P0-P2 every time the SONET frame FR whose frame No. FN is "0" is generated, but constantly sets "FAULT" to the path statuses MST3-MST255 of the non-existing paths P3-P255.

Also, each of the SONET frames FR is multi-framed so that the path statuses MST for 8 paths may be stored in an H4 byte within a path overhead (POH) at one time.

FIG. 32 shows a format example of the above-mentioned H4 byte. In the H4 byte, bits 1-4 of each line are used as a data area and bits 5-8 of each line are used as a multi-frame indicator MFI.

The frame No. FN is set in the bits 1-4 of the lines where the multi-frame indicator MFI indicates "0000" and "0001" (namely, the "0th" and "1st" lines), and the path status MST is set as data for a total of 8 bits having "OK" (0) or "FAULT" (1) per one bit in the bits 1-4 of the lines where the multi-frame indicator MFI indicates "1000" and "1001" (namely, the "8th" and "9th" lines). Also, a path No. PN uniquely identifying the paths P0-P2 to which the SONET frames FR are transmitted is set in the bits 1-4 of the "14th" and "15th" lines.

The transmission device 1R (path status MST receiving side) having received the SONET frames FR through the paths P0-P2 extracts the path status MST and the frame No. FN from each of the SONET frames FR, and identifies which path's occurrence status of reception fault the path status MST extracted corresponds to, according to the associated relationship shown in FIG. 31B.

Thus, the transmission device 1R can recognize whether or not a reception fault has occurred in a desired path on the transmission device 1S, or whether or not the reception fault has recovered, thereby enabling the band described in the above-mentioned control examples (1)-(4) to be enhanced or reduced.

Also, the format of the H4 byte shown in FIG. 32 is commonly used when the path use mode control information CTRL shown in FIG. 27 and the response RS_Ack thereto are transmitted. The path use mode control information CTRL and the response RS_Ack are respectively set in the bits 1-4 of the "2nd" line and the bit 4 of the "10th" line.

Also, as other information, a group identifier GID upon dividing the paths into groups and an error detecting code CRC of the SONET frame FR can be respectively set in the bit 4 of the "3rd" line, and the bits 1-4 of the "6th" and "7th" lines.

It is to be noted that there has been proposed a reference example where shifts of phases between the frames caused by a difference between paths are adjusted on the receiving side of the SONET frame (see e.g. patent document 1).

[Non-patent document 1] ITU-T G.707
[Non-patent document 2] ITU-T G.7042/Y.1305
[Patent document 1] Japanese Patent Application Laid-open No. 2002-232380

In the above-mentioned prior art example, the enhancement or reduction of the band is performed based on the path statuses cyclically transmitted and received in the predetermined cycle. However, in a specific path noticed, the path status thereof can be monitored only per predetermined cycle. Accordingly, there has been a further problem that the reception fault or the recovery thereof which may occur during the cycle can not be detected until the next cycle, so that the enhancement or reduction of the band is delayed.

Particularly, the delay of reduction of the band upon the occurrence of reception faults may lead to an enormous occurrence of abnormal data. In the worst case, such a delay leads to a failure of the transmission device, a communication disconnection, and the like.

SUMMARY OF THE INVENTION

It is accordingly an object of the present invention to provide a path status monitoring method and device which can enhance or reduce a band more rapidly.

[1] In order to achieve the above-mentioned object, a path status monitoring method (or device) according to one aspect of the present invention comprises: a first step of (or first portion) cyclically generating frames serially connected for a number equivalent to an operation upper limit number of parallel physical paths, respectively for actually existing physical paths; a second step of (or second portion) shifting phases of the frames between the paths based on the number of the paths; and a third step of (or third portion) collecting, when transmitting the frames through each path, statuses where a reception fault has occurred in each path to be stored in a frame predetermined per path among the frames.

Namely, in the path status monitoring method (or device) according to one aspect of the present invention (on a transmitting side of a path status), phases of frames generated in the same way as the prior art example shown in FIGS. 31A and 31B are shifted between paths, and then the latest statuses where a reception fault has occurred upon a transmission of the frames to each path are stored in a frame predetermined per path among the frames.

Thus, on a receiving side of the path status, the statuses where the reception fault has occurred in each path can be monitored at an interval shorter than a circulating cycle of the frames, so that an enhancement or a reduction of a band can be performed more rapidly.

[2] Also, in the above-mentioned [1], an interval to shift the phases of the frames may comprise a time interval obtained by equally dividing a circulating cycle of the frames by the number of the paths.

Namely, in this case, the receiving side of the path status can monitor statuses of reception fault occurrence in the paths at an equal interval which is shorter than the circulating cycle of the frames, so that the enhancement or reduction of the band can be performed more accurately.

[3] Also, in the above-mentioned [1], the second step may include a step of collecting the statuses where the reception fault has occurred in each path, and of shifting, based on a number of normal paths where no reception fault has occurred, the phases of the frames only between the normal paths.

Namely, the frames transmitted through a path where the reception fault has occurred (hereinafter, referred to as abnormal path) may not arrive at the receiving side of the path status. Therefore, the phases of the frames are shifted only between normal paths where the frames can reliably arrive at the receiving side. Contrarily, the statuses where the reception fault has occurred in each path are accurately stored in the frames transmitted through the abnormal path so as not to have the occurrence of the reception fault or the recovery thereof erroneously detected when the frames arrive at the receiving side of the path status.

[4] Also, in the above-mentioned [3], an interval to shift the phases of the frames may comprise a time interval obtained by equally dividing a circulating cycle of the frames by the number of the normal paths.

[5] Also, in the above-mentioned [2], the second and third steps may be executed per group into which the paths are divided per predetermined number of paths to transmit frames of same phases between the groups, so that even when the reception fault occurs in one path among one group at a destination of the frames, the destination can receive through any one of the paths among other groups the frame with the same phase as that of the frame transmitted through the one path.

Namely, in this case, even when the reception fault has occurred in the path, the receiving side of the path status can reliably detect the occurrence of the reception fault in the paths or the recovery thereof.

[6] Also, in the above-mentioned [1], the third step may include a step of assigning to each of the frames an order for having the frames processed in order of the transmission to each path at a destination of the frames.

Namely, a reception order of the frames on the receiving side of the path status may be different from a transmission order at the transmitting side of the path status. Therefore, the transmitting side of the path status assigns the transmission order to each of the frames.

Thus, the receiving side of the path status can accurately detect the occurrence of the reception fault in the paths or the recovery thereof in order of the event.

[7] Also, in the above-mentioned [5], the third step may include a step of assigning to each of the frames per group an order for having the frames processed in order of the transmission to each path at a destination of the frames.

Namely, in this case, even when a reception fault has occurred in a path, the receiving side of the path status can detect the occurrence of the reception fault in the paths or the recovery thereof reliably and accurately in order of the event.

[8] Also, in the above-mentioned [1], a fourth step of generating the frames to be transmitted to each path with the same phases before the first step, and a fifth step of delaying, after the fourth step, the frames sequentially generated in each path to be transmitted until a frame received from a destination of the frames indicates the occurrence of the reception fault, of obtaining a delay upon the occurrence of the reception fault as a transmission delay allowed for the path by the destination, and of obtaining transmission delays of the frames which occur between the paths by subtracting the respective allowable transmission delays from a maximum allowable transmission delay among the allowable transmission delays obtained in all of the paths may further comprise, and the second step may include a step of shifting the phases of the frames generated at the first step between the paths by a time interval obtained by equally dividing a circulating cycle of the frames by the number of the paths in ascending order of the transmission delay, and then of restoring the shifts of the respective phases by the respective transmission delays.

Namely, transmission delays may occur in the frames between the paths due to a difference between the paths. In this case, it is preferable to shift the phases of the frames in view of the transmission delays.

Therefore, at the fourth and fifth steps, the transmission delays of the paths are measured in advance of the execution of the first, second, and third steps.

Namely, at the fourth step, the frames are firstly generated and transmitted to each path with the same phase. Then, forcibly delaying the frames sequentially generated in each path to be transmitted at the fifth step makes the reception fault occur at the destination of the frames. The then delay is obtained as a transmission delay allowed for the path by the destination.

A path where a maximum allowable transmission delay is obtained can be regarded as one where the transmission delay is most allowable, namely as a reference path whose actual transmission delay is minimum ("0"). Also, paths where other allowable transmission delays are obtained are ones where the transmission delays are allowed by the time (namely, time from the actual transmission delay for the reference path up to the maximum allowable transmission delay).

Accordingly, at the fifth step, transmission delays of the respective paths are obtained by subtracting the respective allowable transmission delays from the maximum allowable transmission delay.

At the second step, the phases of the frames generated at the first step are shifted in the same way as the above-mentioned [2], and then the shifts of the respective phases are restored by the respective transmission delays.

Thus, even when the transmission delays have occurred between the paths, the receiving side of the path status can monitor the statuses of the reception fault occurrence in the paths at an equal interval which is shorter than the circulating cycle of the frames.

[9] Also, in the above-mentioned [1], the second step may include a fourth step of receiving a transmission delay of each path from a destination of the frames, and a fifth step of shifting the phases of the frames between the paths by a time interval obtained by equally dividing a circulating cycle of the frames by the number of the paths in ascending order of the transmission delay, and then of restoring the shifts of the respective phases by the respective transmission delays.

[10] Also, in the above-mentioned [9], each transmission delay may be sequentially set in a vacant area in a header of a frame having common contents received through each path, and the fifth step may include a step of shifting, at a normal time, the phases of the frames generated at the first step by using the transmission delay set in the vacant area in the header of the frame received through one path, and of shifting, when the reception fault occurs in the one path, the phases of the frames generated at the first step by using the transmission delay set in the vacant area in the header of the frame received through other paths.

[11] Also, in the above-mentioned [1], a fourth step of transmitting a loopback control frame through each path before the first step, of measuring a round-trip transmission time per path until the loopback control frame is folded and returned back from a destination of the frames, and of obtaining transmission times of the paths from the respective round-trip transmission times, and a fifth step of obtaining transmission delays of the frames which occur between the paths by subtracting a minimum transmission time among the transmission times obtained in all of the paths from the respective transmission times may be further comprised, and the second step may include a step of shifting the phases of the frames generated at the first step between the paths by a time interval obtained by equally dividing a circulating cycle of the frames by the number of the paths in ascending order of the transmission delay, and then of restoring the shifts of the respective phases by the respective transmission delays.

[12] Also, a path status monitoring method (or device) according to one aspect of the present invention in order to achieve the above-mentioned object comprises: a first step of (or first portion) receiving frames which are cyclically generated respectively for actually existing physical paths and serially connected by a number equivalent to an operation upper limit number of parallel physical paths, whose phases are shifted between the paths at a source of the frames, and in which statuses where a reception fault has occurred in each path at the source are stored, through each path; and a second step of (or second portion) extracting, every time the frames are received, the statuses where the reception fault has occurred in each path at the source from the frames.

Namely, on the receiving side of the path status, the statuses of the reception fault occurrence in the paths can be monitored at an interval shorter than the circulating cycle of the frames as described in the above-mentioned [1], so that the enhancement or reduction of the band can be performed more rapidly.

[13] Also, in the above-mentioned [12], the paths may be divided into groups per a predetermined number of paths, phases of the frames for the paths among each group may be shifted so as to have same phase between the groups by a time interval obtained by equally dividing a circulating cycle of the frames by the predetermined number of paths, and the second step may include a step of performing, at a normal time, the extraction from the frames received through the paths among one group and of performing, when the reception fault occurs in one path among the one group, the extraction from the frame with the same phase as that of the frame received through the one path among the frames received through the paths among other groups.

[14] Also, in the above-mentioned [12], a transmission order to each path at the source may be assigned to each of the frames, and the second step may include a step of performing the extraction from the frames received through the paths according to the transmission order.

[15] Also, in the above-mentioned [14], the second step may further include a step of performing, when the reception fault occurs in one path, the extraction according to other transmission order except the transmission order corresponding to the one path.

[16] Also, in the above-mentioned [12], the paths may be divided into groups by a predetermined number of paths, phases of the frames for the paths among each group may be shifted by a time interval obtained by equally dividing a circulating cycle of the frames by the predetermined number of paths, a transmission order to each path at the source may be assigned to each of the frames per group, and the second step may include a step of performing, at a normal time, the extraction from the frames received through the paths among one group according to the transmission order and of performing, when the reception fault occurs in one path among the one group, the extraction from the frame to which the same transmission order as that of the frame received through the one path is assigned among the frames received through the paths among other groups.

[17] Also, in the above-mentioned [12], a third step of measuring transmission delays of the frames which occur between the paths to be transmitted to the source through at least a single path may be further comprised.

[18] Also, in the above-mentioned [17], the third step may transmit through each path a frame where each transmission delay is sequentially set in a vacant area in a header.

According to the present invention, the enhancement or reduction of the band can be performed more rapidly, thereby enabling a transmission device to which the present invention is applied to be normally operated, and enabling communication quality to be guaranteed.

Also, it is made possible to accurately monitor the path status even when the transmission delays have occurred between the paths, so that the operation can be performed under various communication conditions.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 12 is a diagram showing a format example of an H4 byte used for an embodiment [4] of a path status monitoring method and device according to the present invention;

FIG. 32 is a diagram showing a format example of an H4 byte used for a path status monitoring.

DESCRIPTION OF THE EMBODIMENTS

Figure 1:
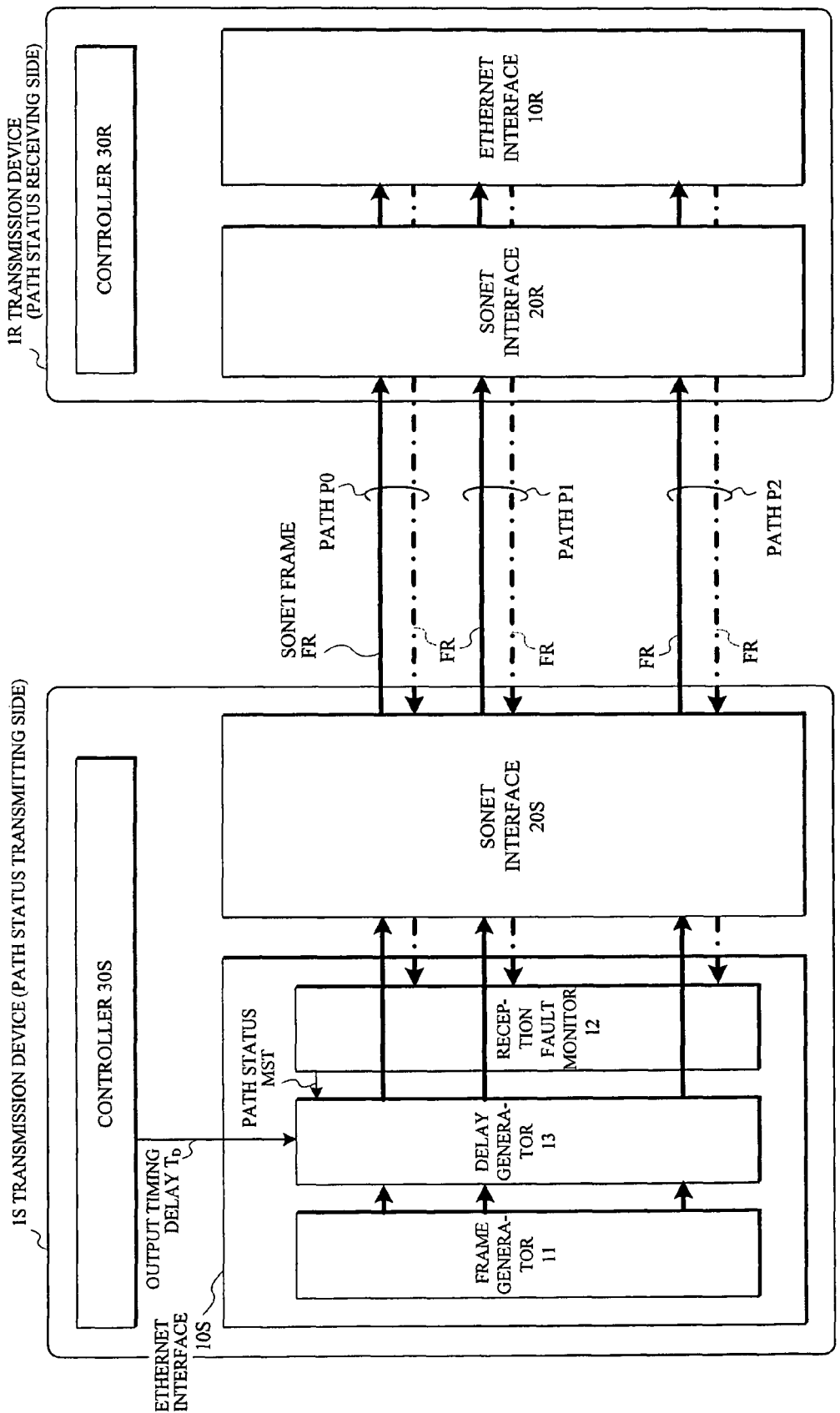
FIG. 1 is a block diagram showing an overall arrangement of an embodiment [1] of a path status monitoring method and device according to the present invention.
Figure 2:
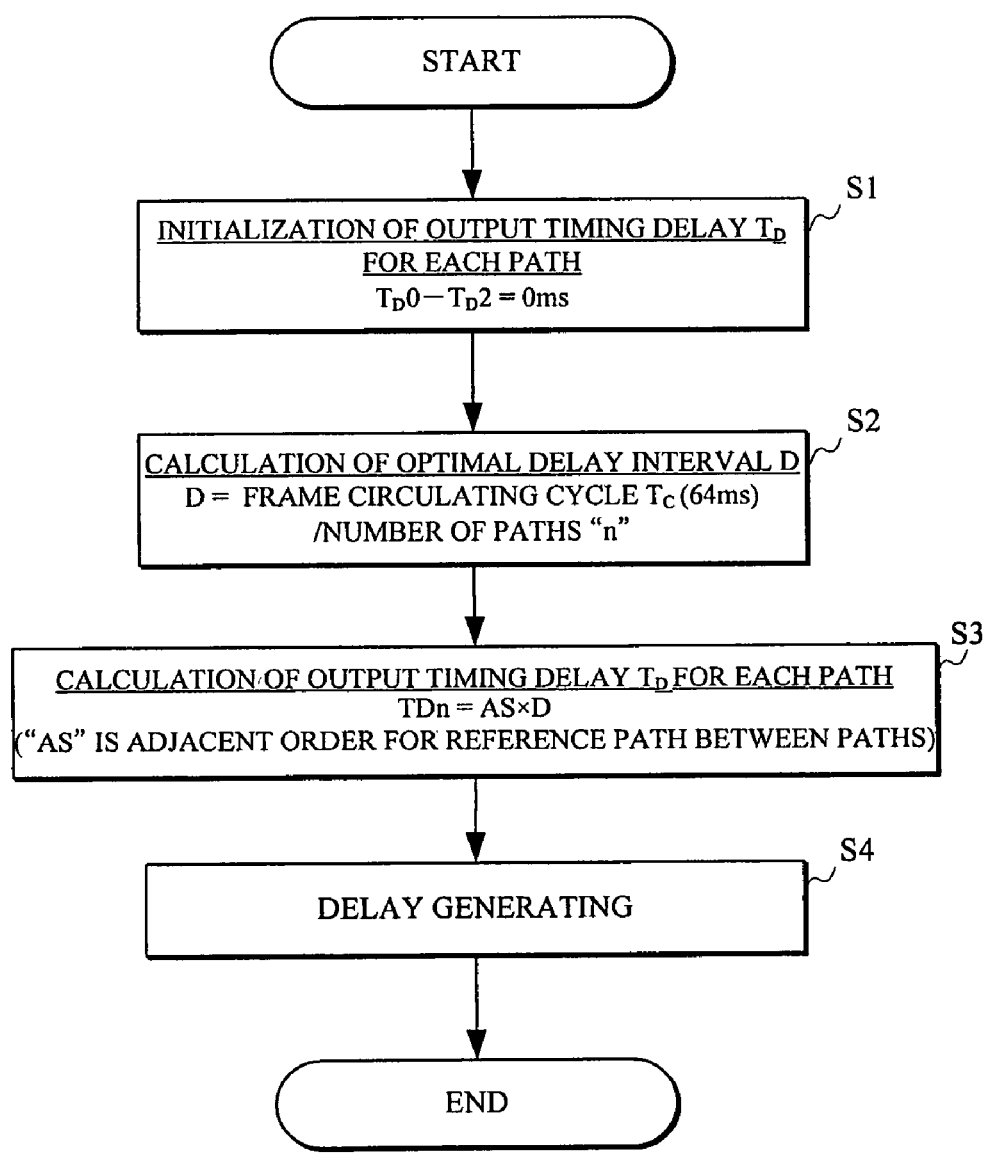
FIG. 2 is a flowchart showing an overall operation example of a transmission device on a path status transmitting side used for an embodiment [1] of a path status monitoring method and device according to the present invention.
Figure 3:
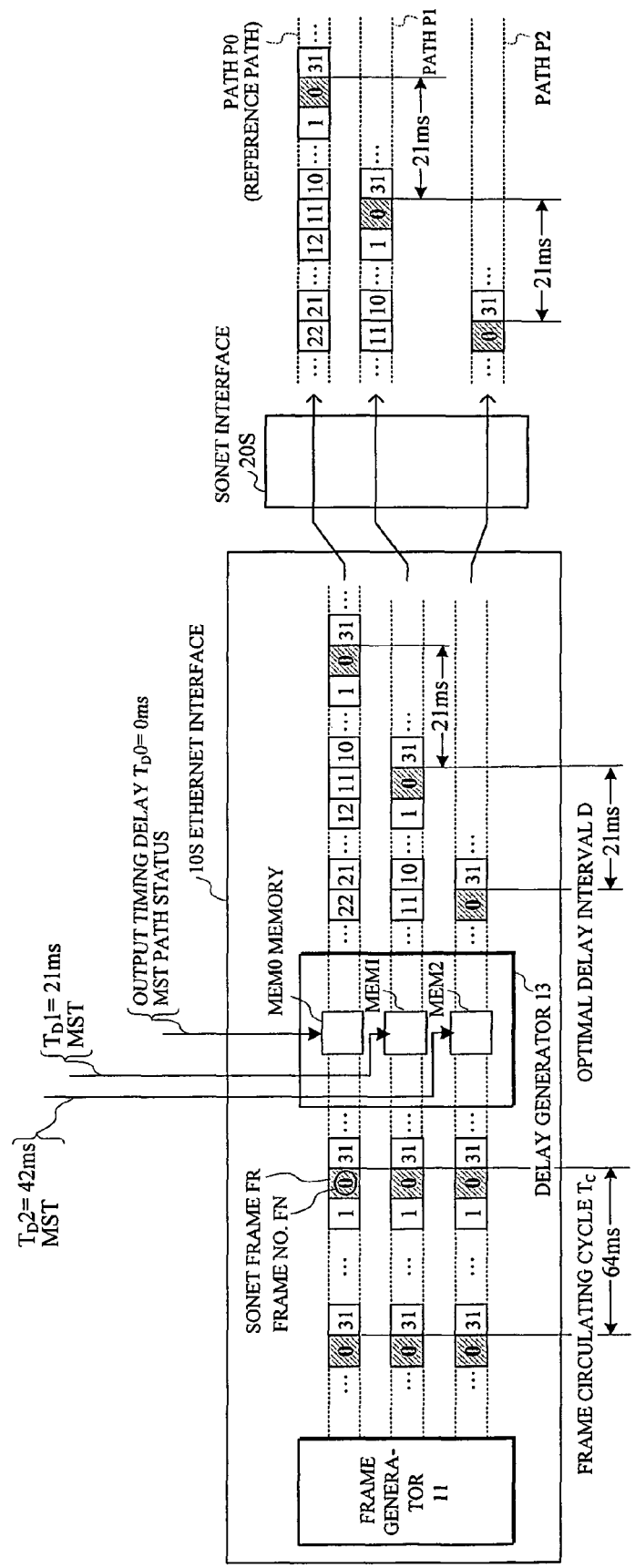
FIG. 3 is a block diagram showing a delay generating example of an embodiment [1] of a path status monitoring method and device according to the present invention.
Figure 4:
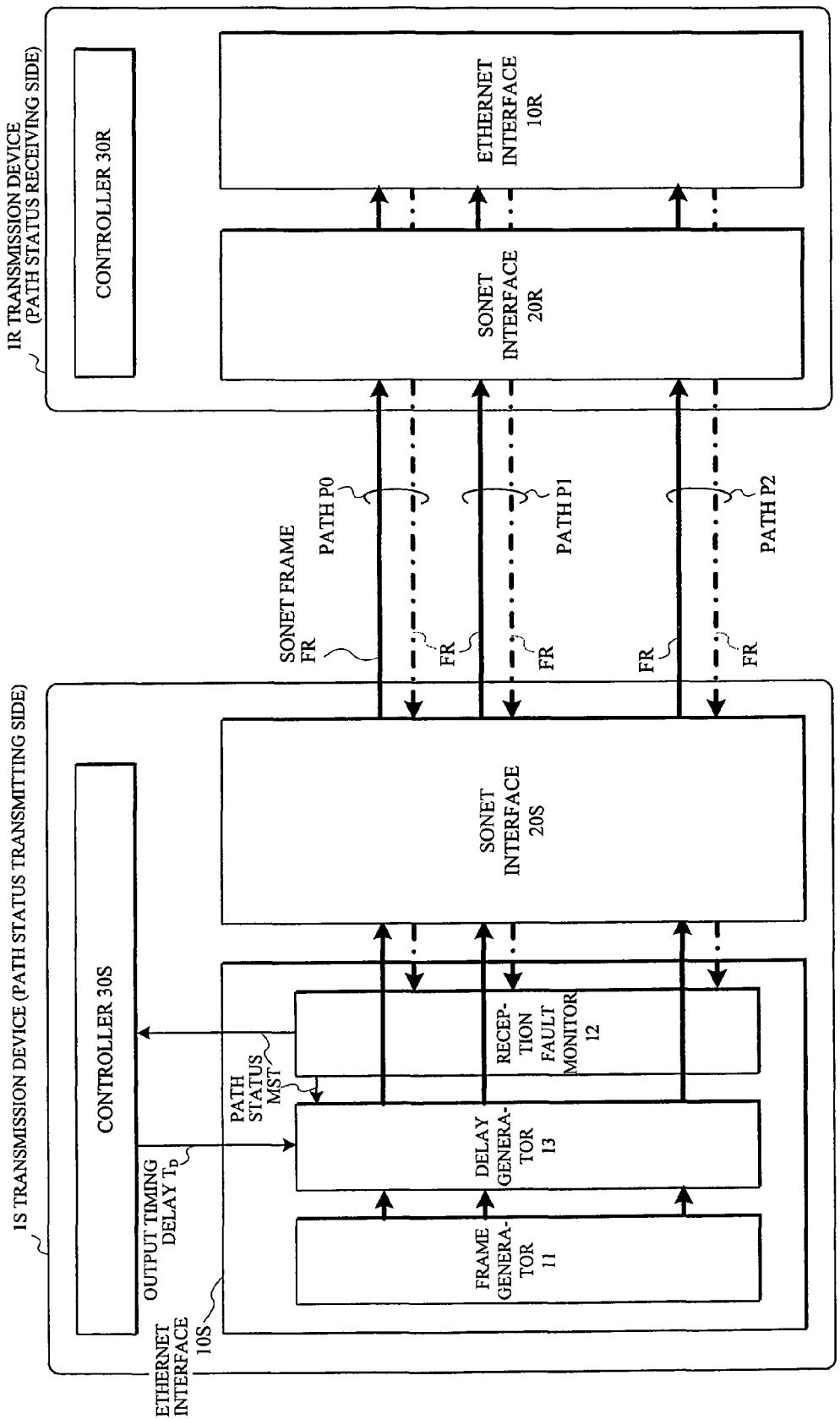
FIG. 4 is a block diagram showing an overall arrangement of an embodiment [2] of a path status monitoring method and device according to the present invention.
Figure 5:
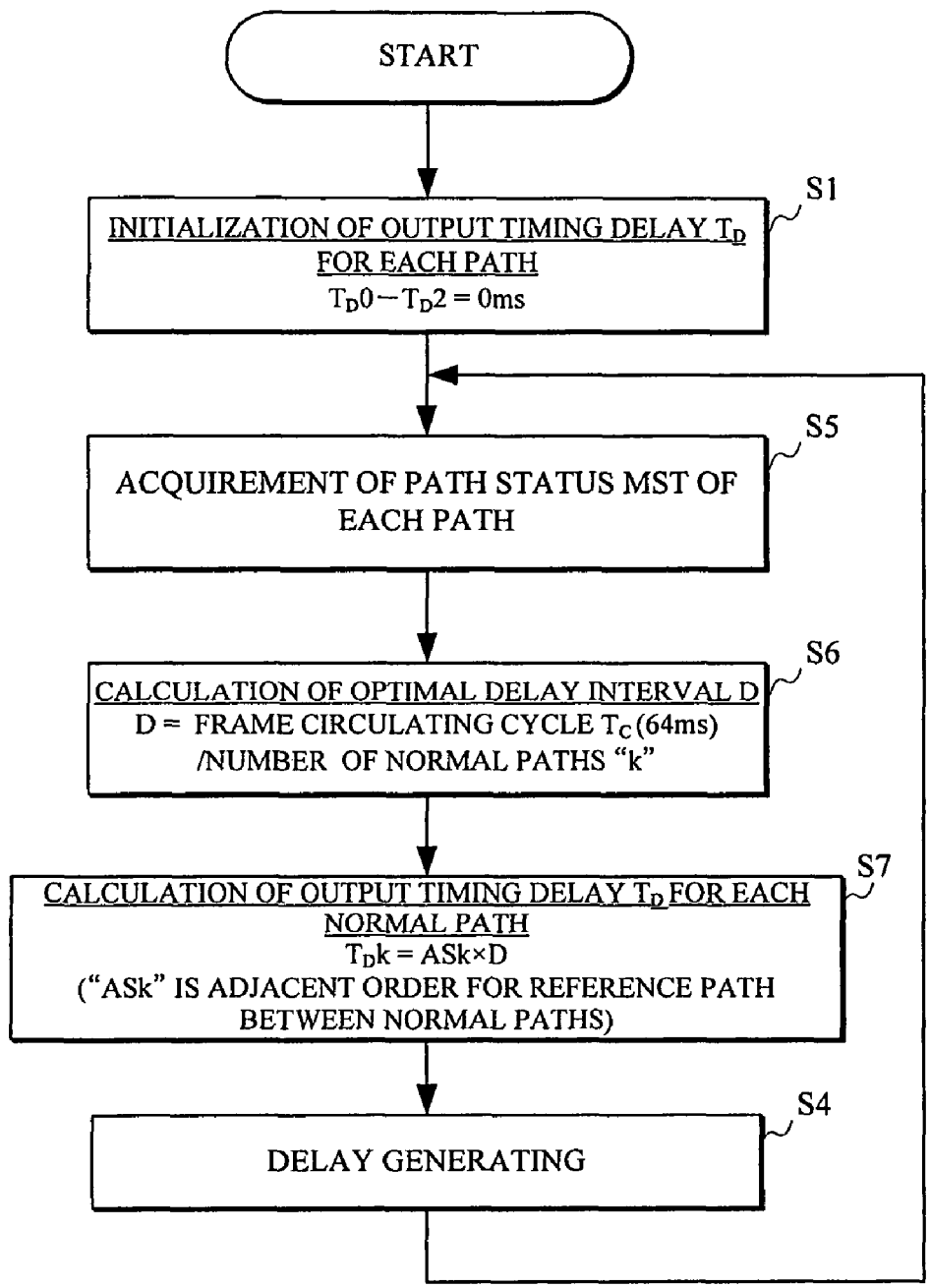
FIG. 5 is a flowchart showing an overall operation example of a transmission device on a path status transmitting side used for an embodiment [2] of a path status monitoring method and device according to the present invention.
Figure 6:
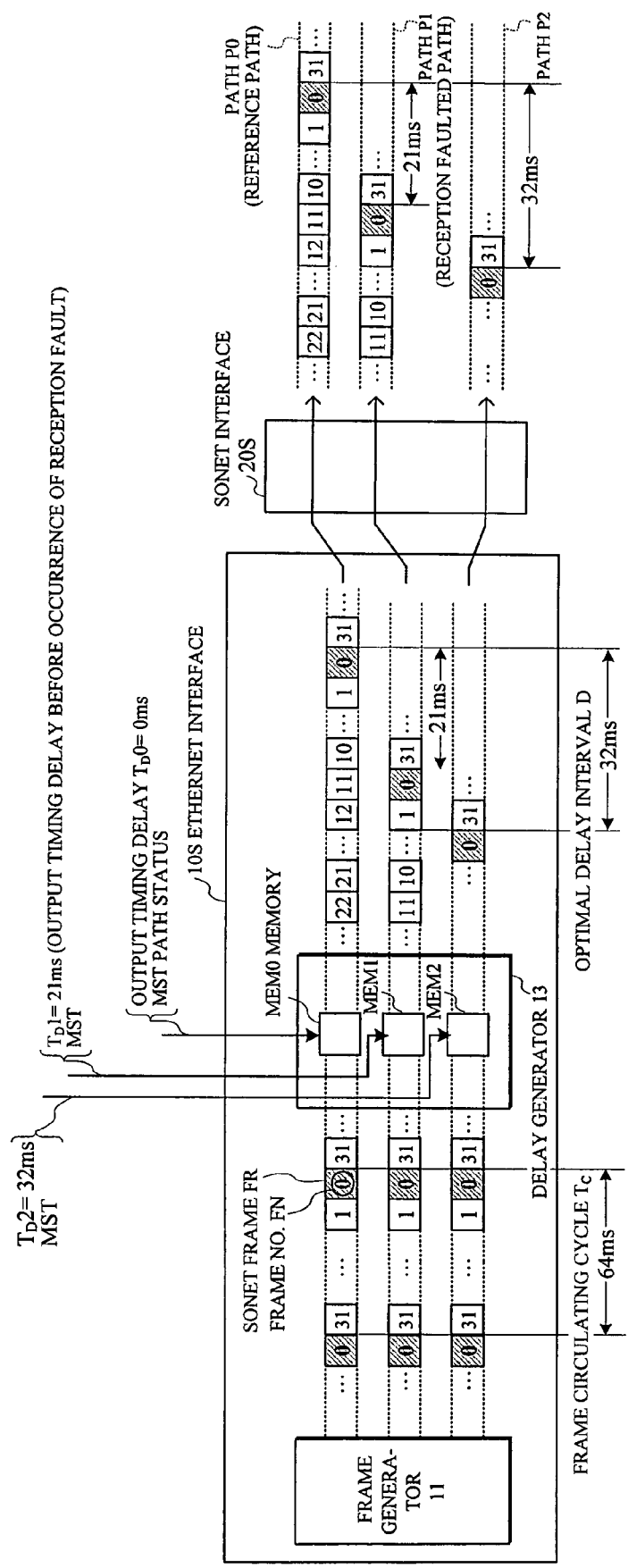
FIG. 6 is a block diagram showing a delay generating example of an embodiment [2] of a path status monitoring method and device according to the present invention.
Figure 7:
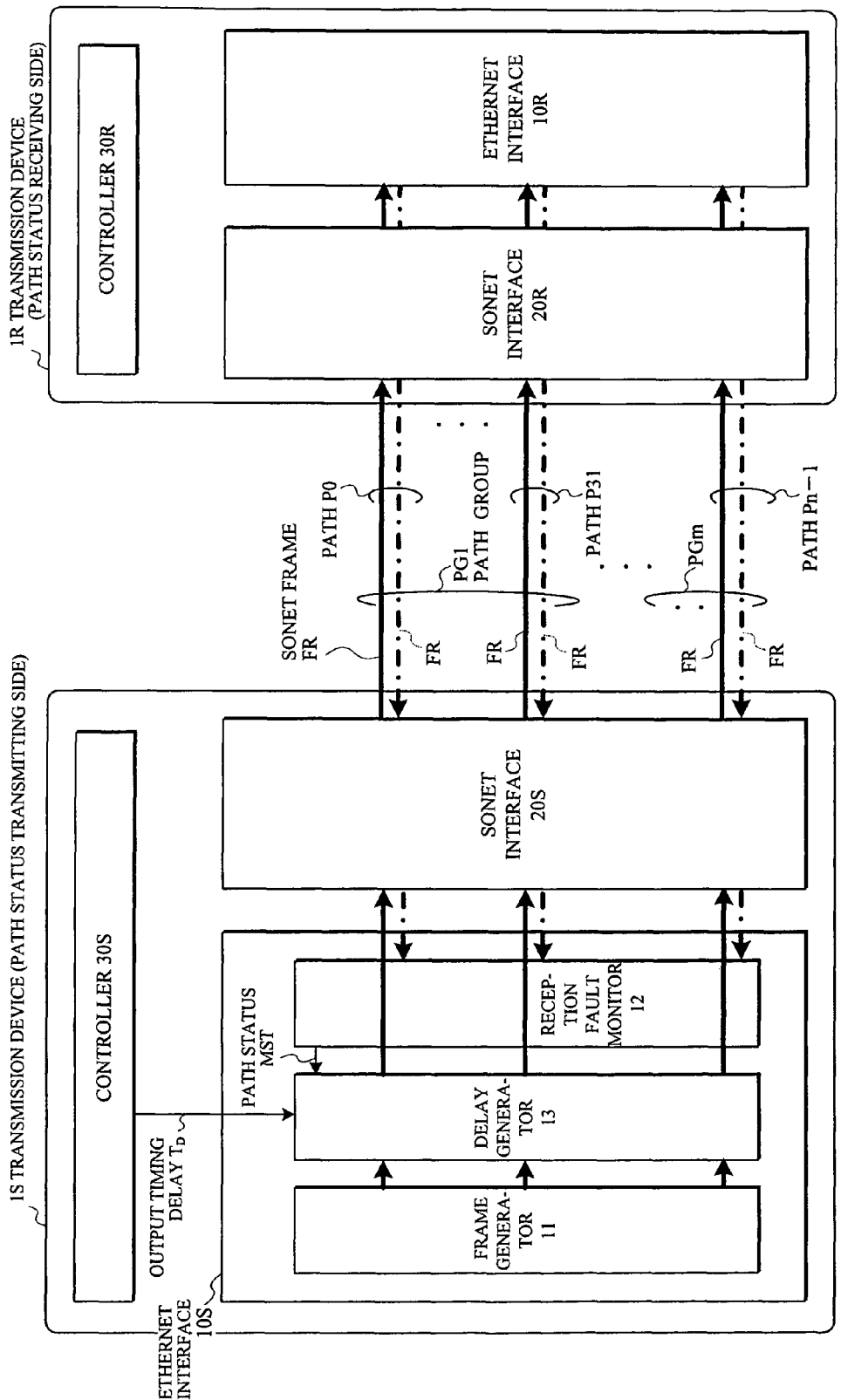
FIG. 7 is a block diagram showing an overall arrangement of an embodiment [3] of a path status monitoring method and device according to the present invention.
Figure 8:
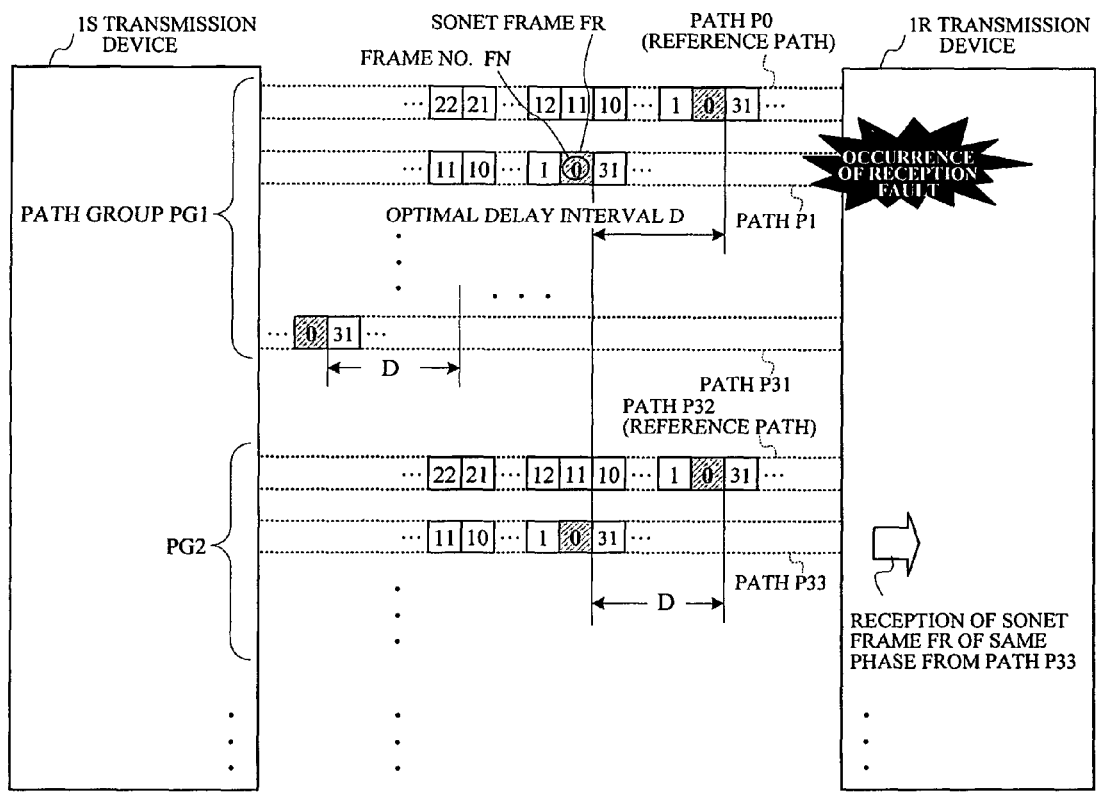
FIG. 8 is a block diagram showing an overall operation example of an embodiment [3] of a path status monitoring method and device according to the present invention.
Figure 9:
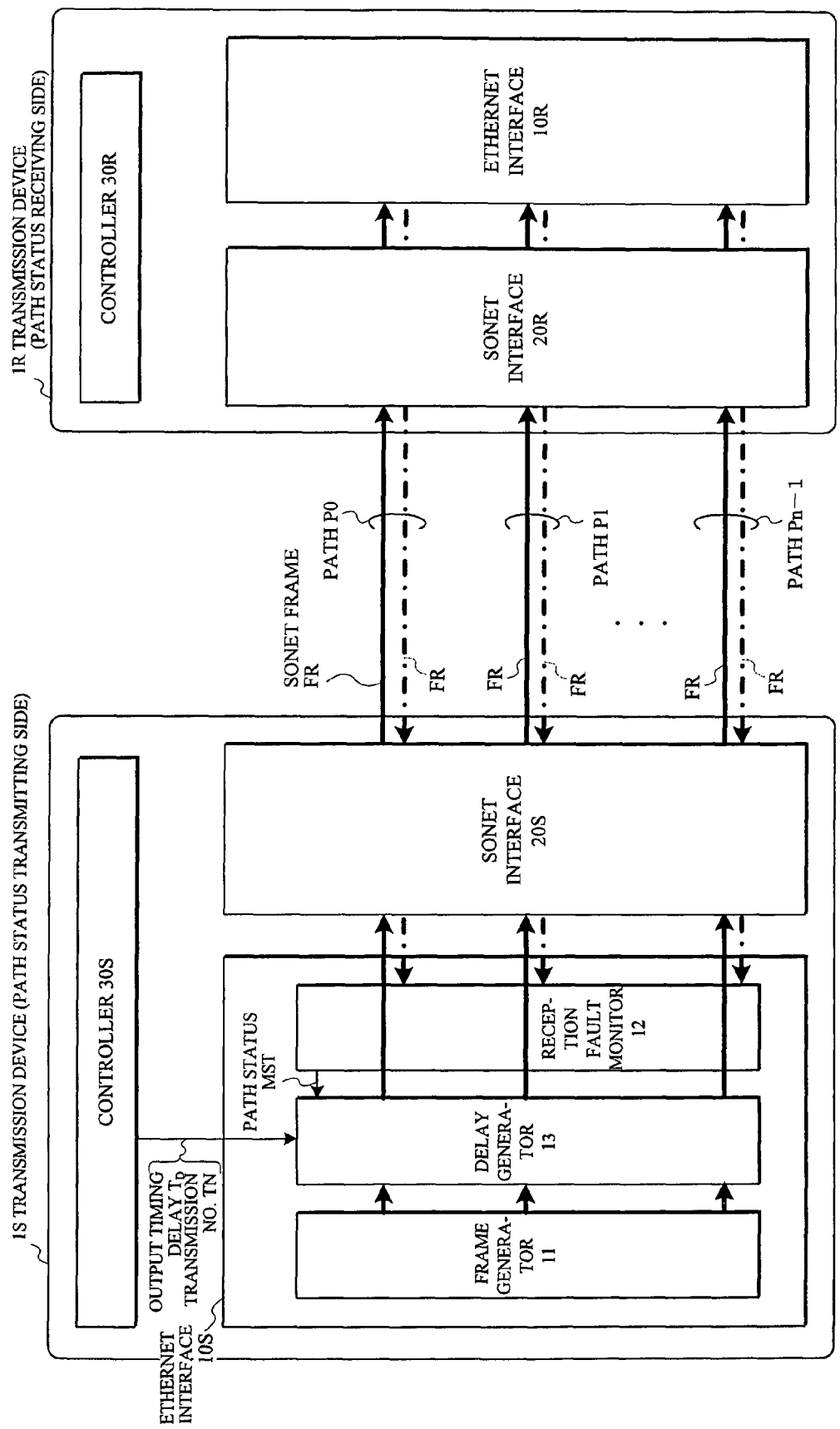
FIG. 9 is a block diagram showing an overall arrangement of an embodiment [4] of a path status monitoring method and device according to the present invention.
Figure 10:
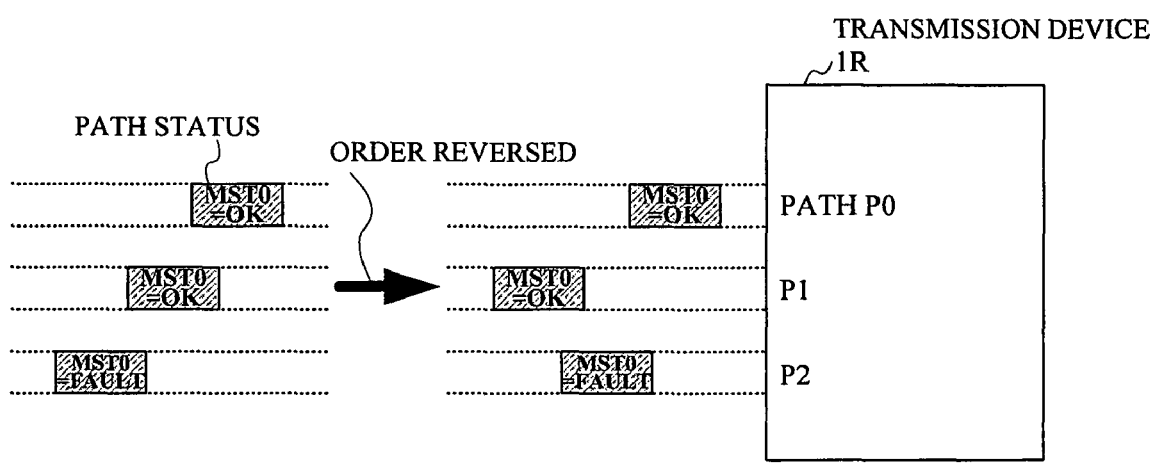
FIG. 10 is a block diagram showing an example of a reversed appearance of a path status arrival order.
Figure 11A:
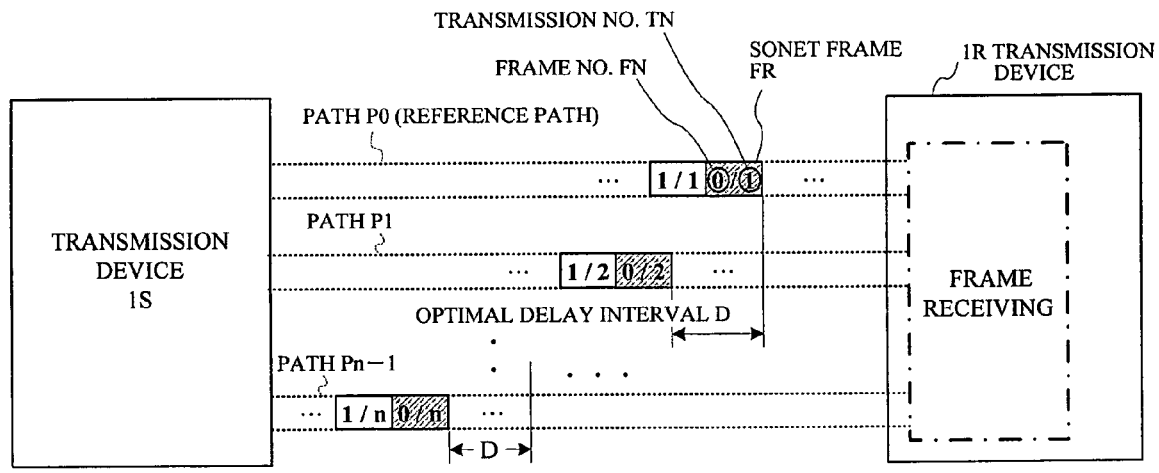
FIGS. 11A and 11B are diagrams showing an operation example (1) of an embodiment [4] of a path status monitoring method and device according to the present invention.
Figure 11B:
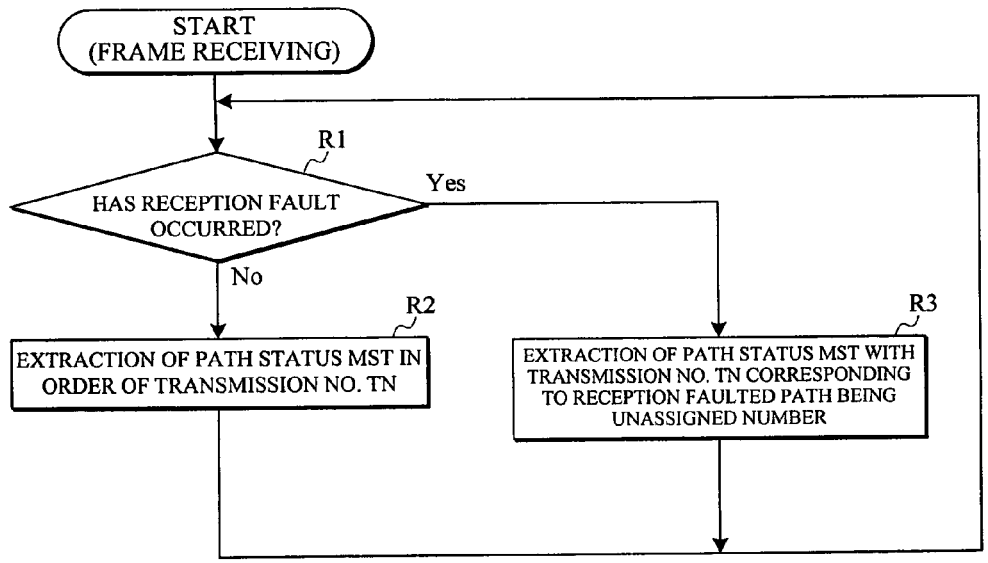
Figure 13A:
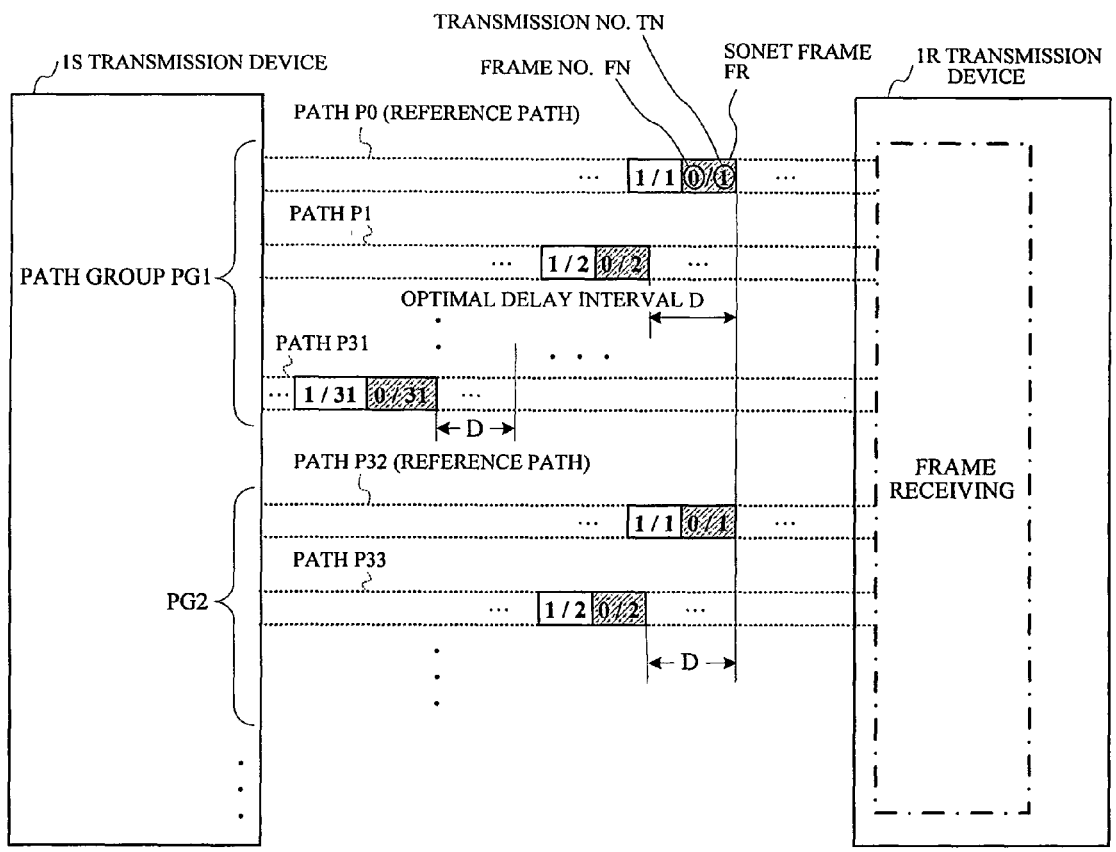
FIGS. 13A and 13B are diagrams showing an operation example (2) of an embodiment [4] of a path status monitoring method and device according to the present invention.
Figure 13B:
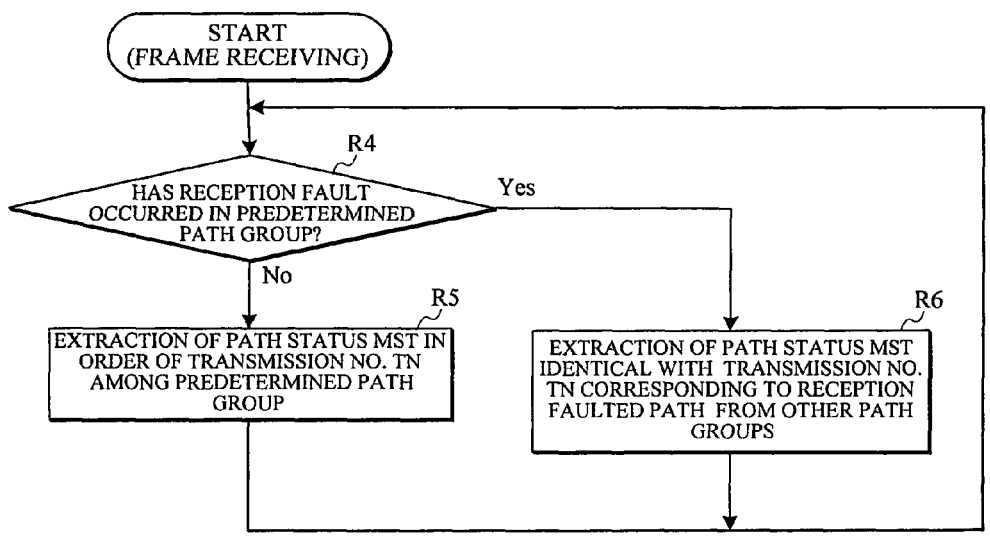
Figure 14:
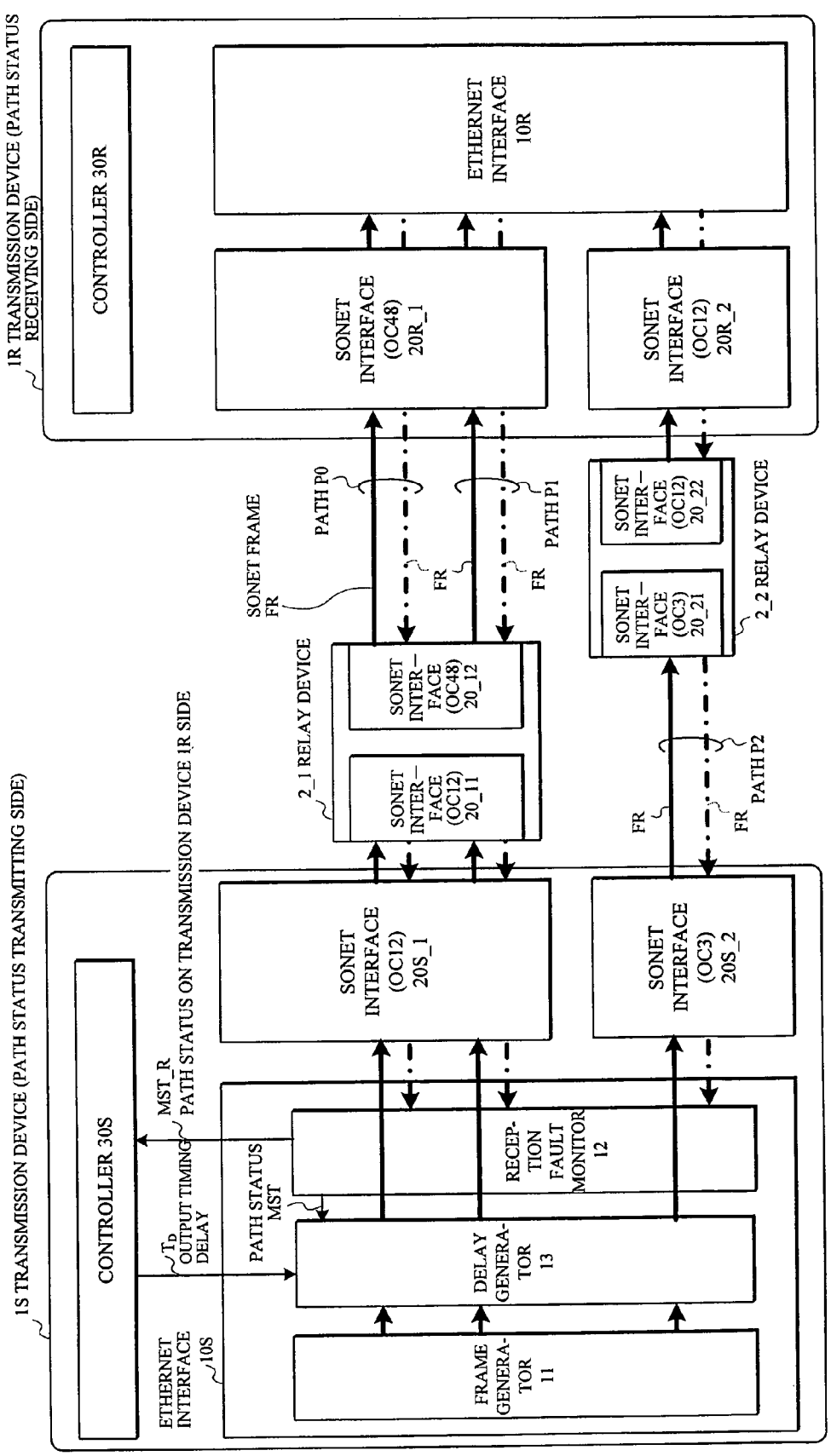
FIG. 14 is a block diagram showing an overall arrangement of an embodiment [5] of a path status monitoring method and device according to the present invention.
Figure 15:
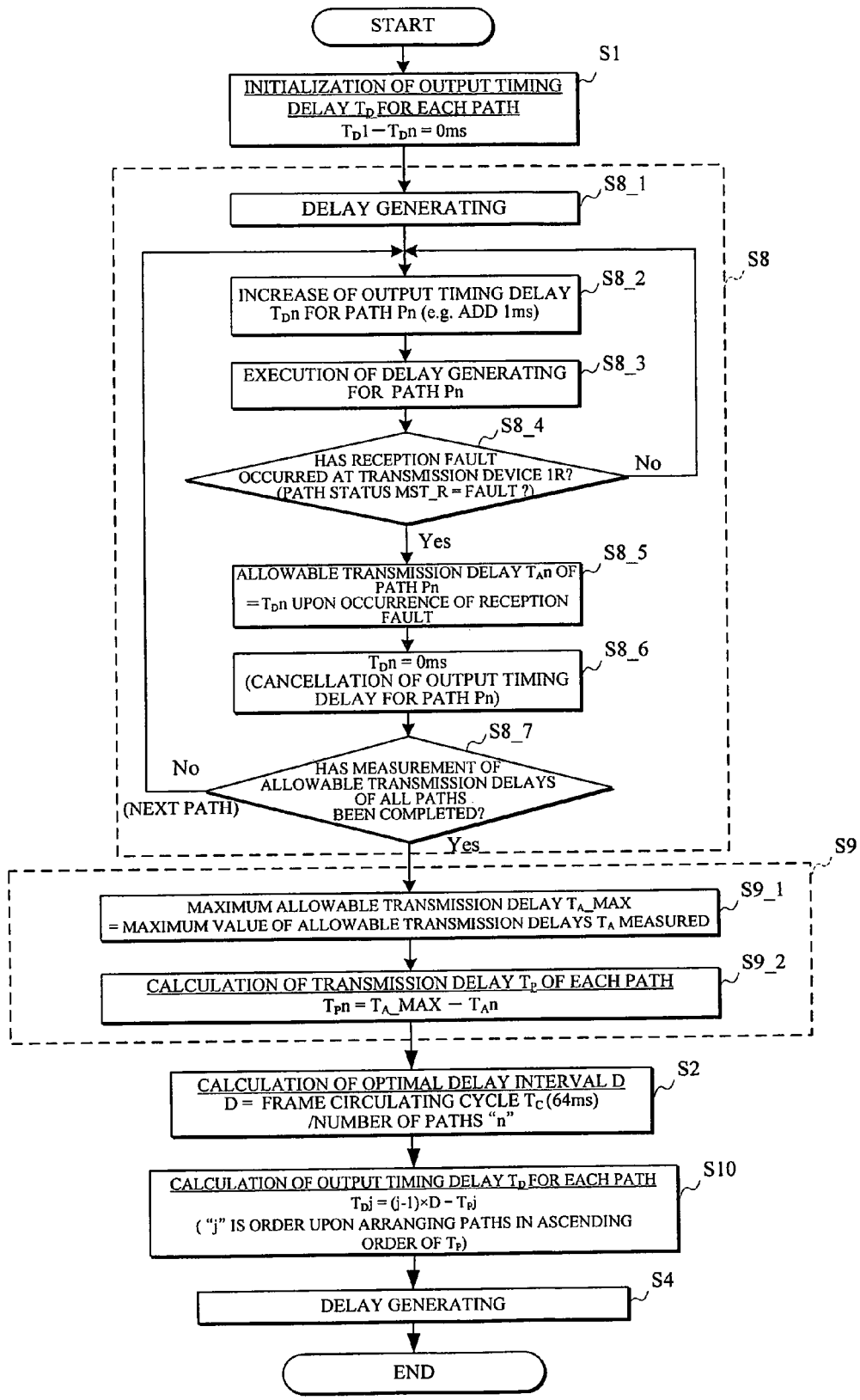
FIG. 15 is a flowchart showing an overall operation example of a transmission device on a path status transmitting side used for an embodiment [5] of a path status monitoring method and device according to the present invention.
Figure 16:
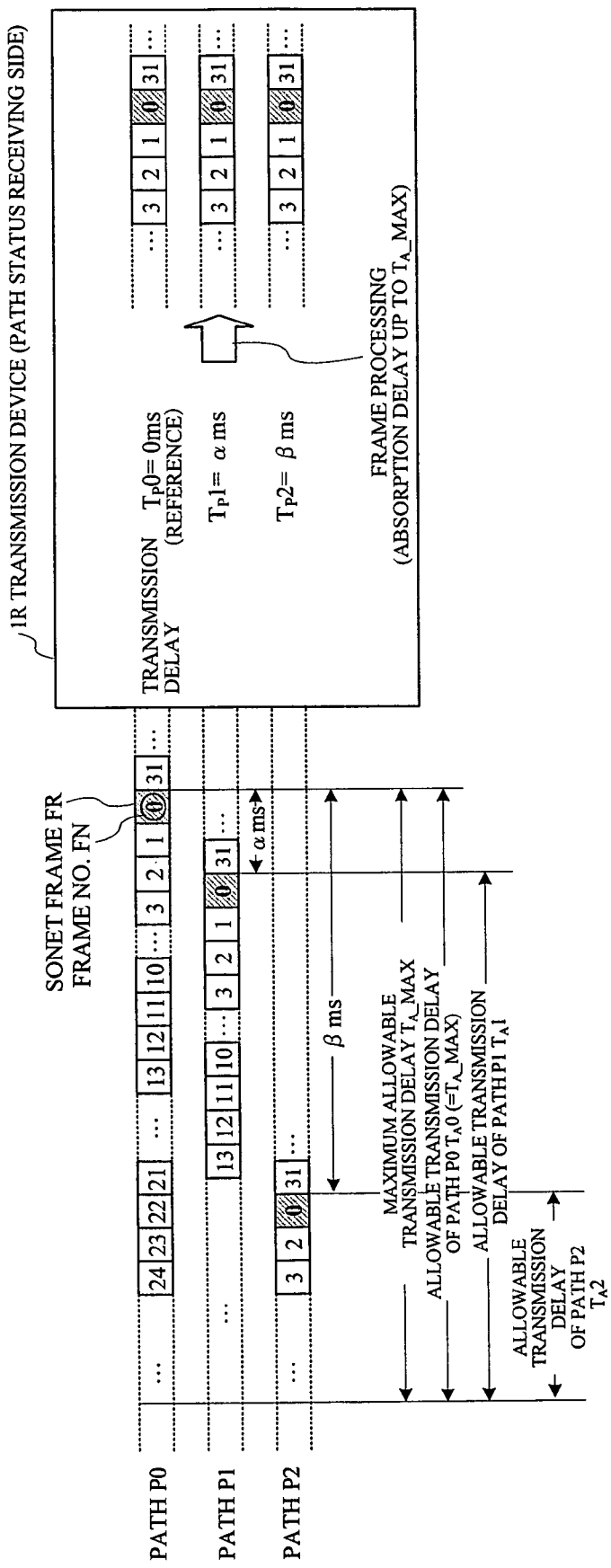
FIG. 16 is a block diagram showing a transmission delay example of a SONET frame.
Figure 17:
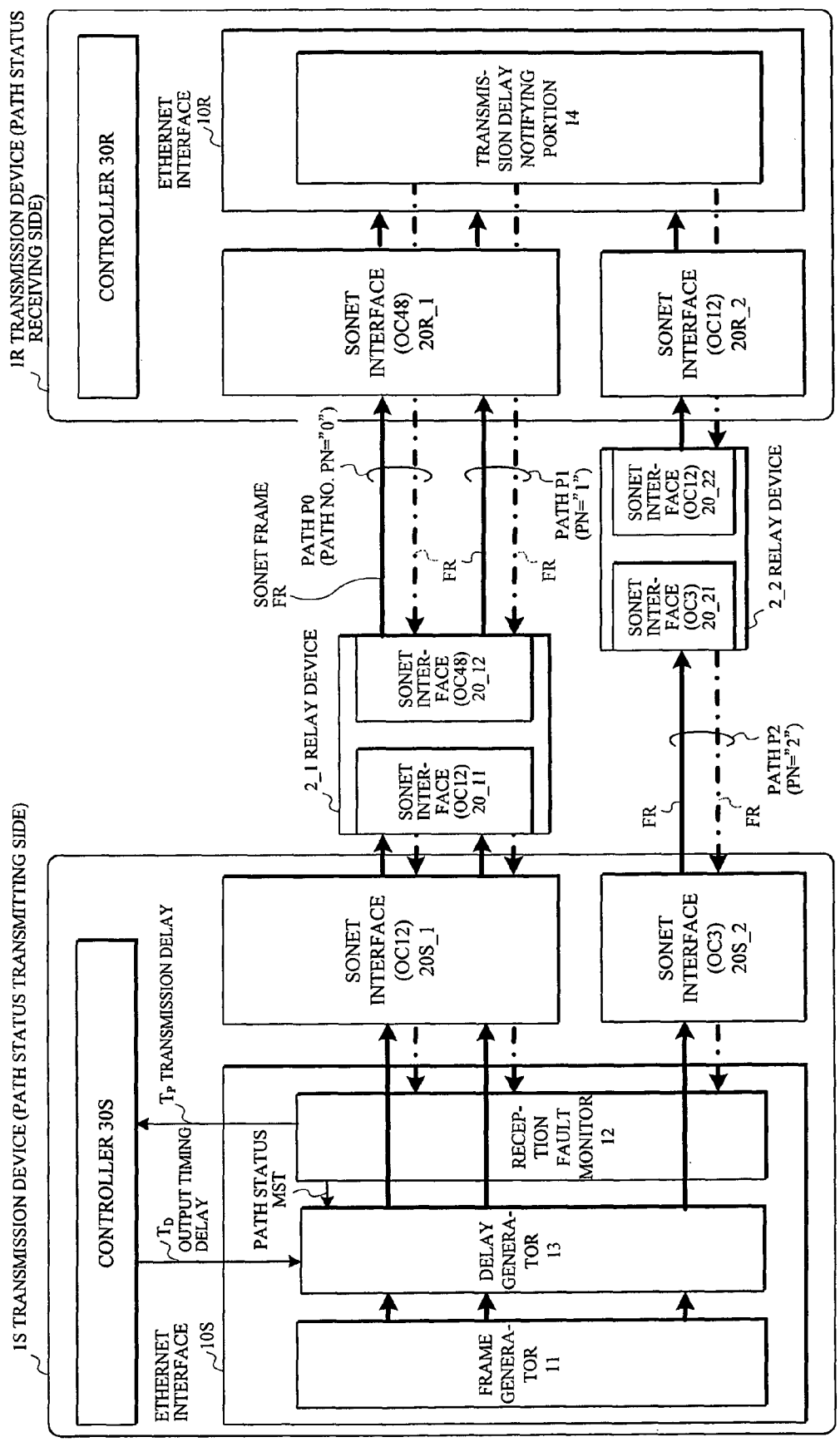
FIG. 17 is a block diagram showing an overall arrangement of an embodiment [6] of a path status monitoring method and device according to the present invention.
Figures 18A, 18B:
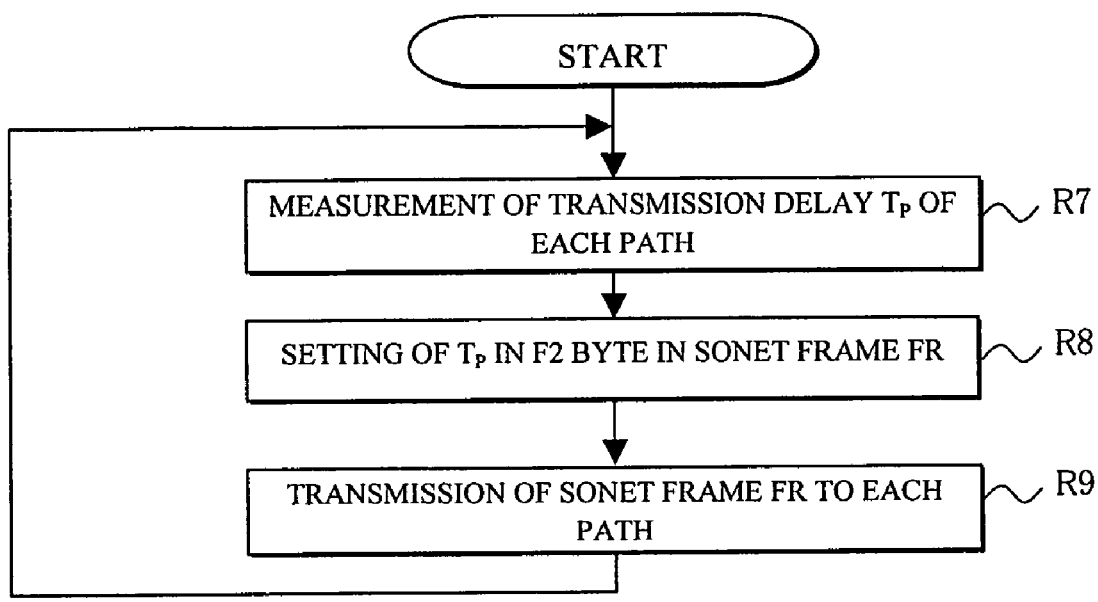
FIGS. 18A and 18B are diagrams showing an embodiment (1) of a transmission delay notifying portion used for an embodiment [6] of a path status monitoring method and device according to the present invention.
Figures 19A, 19B:
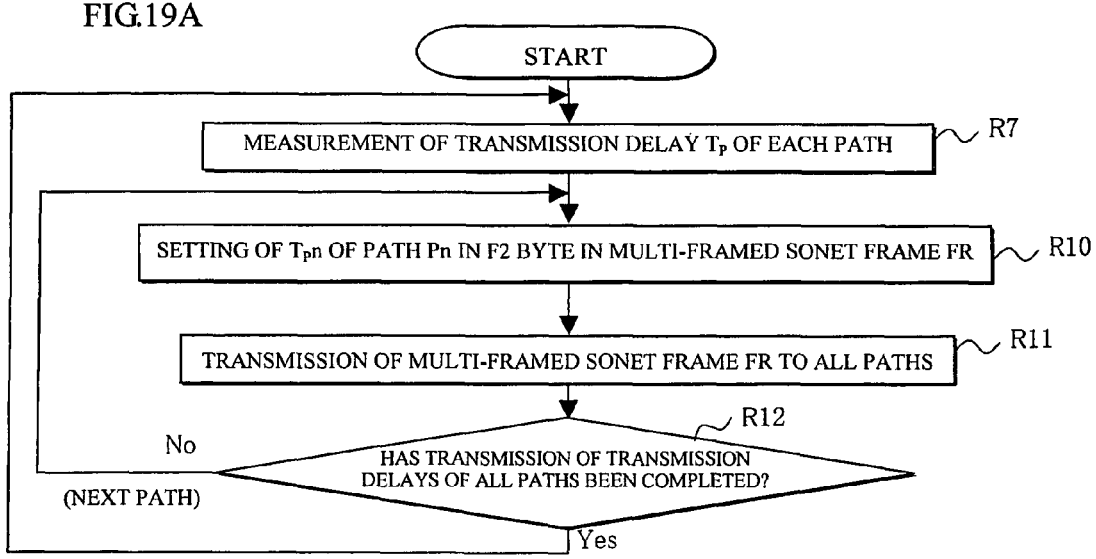
FIGS. 19A and 19B are diagrams showing an embodiment (2) of a transmission delay notifying portion used for an embodiment [6] of a path status monitoring method and device according to the present invention.
Figure 20:
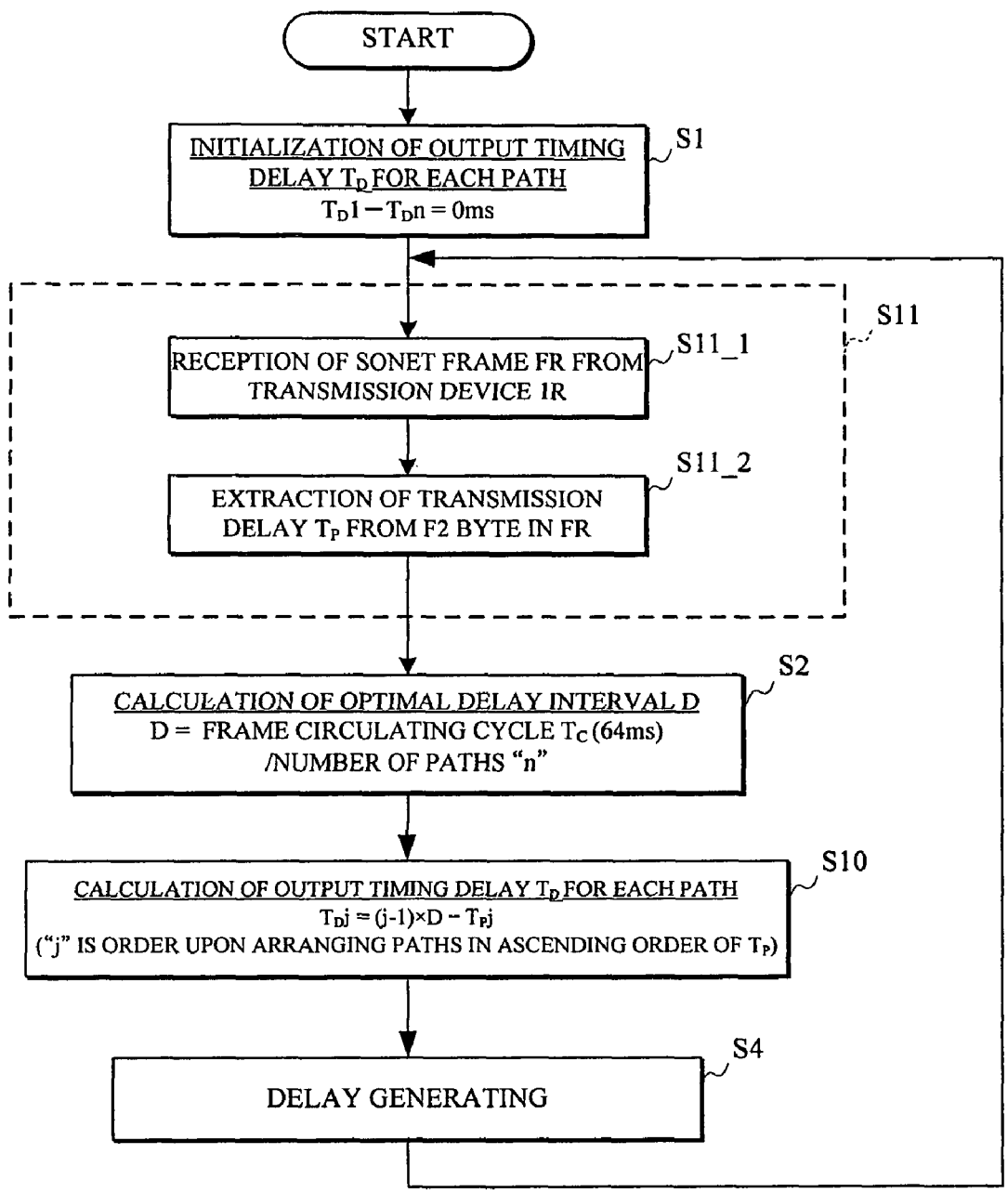
FIG. 20 is a flowchart showing an overall operation example of a transmission device on a path status transmitting side used for an embodiment [6] of a path status monitoring method and device according to the present invention.
Figure 21:
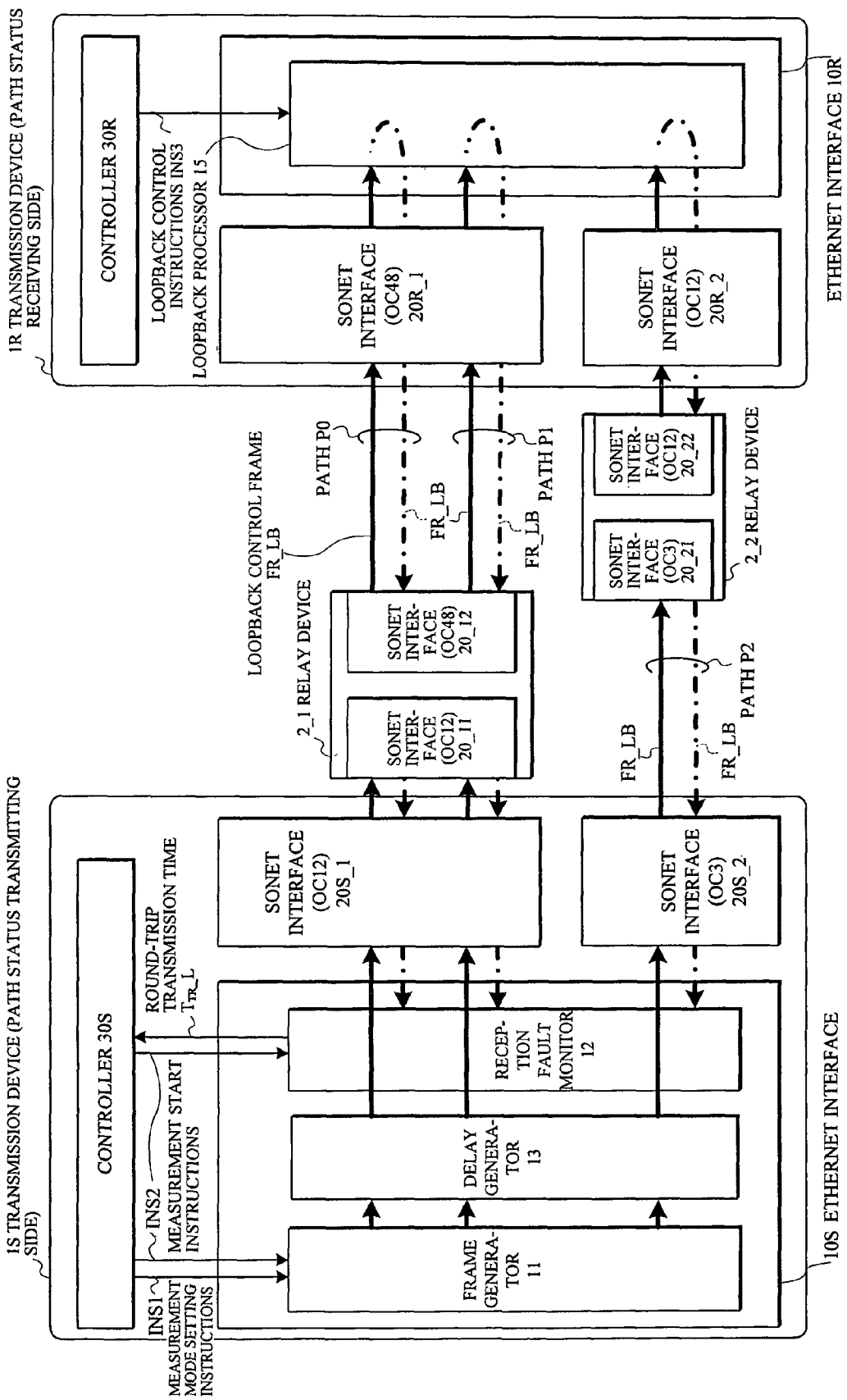
FIG. 21 is a block diagram showing an overall arrangement of an embodiment [7] of a path status monitoring method and device according to the present invention.
Figure 22:
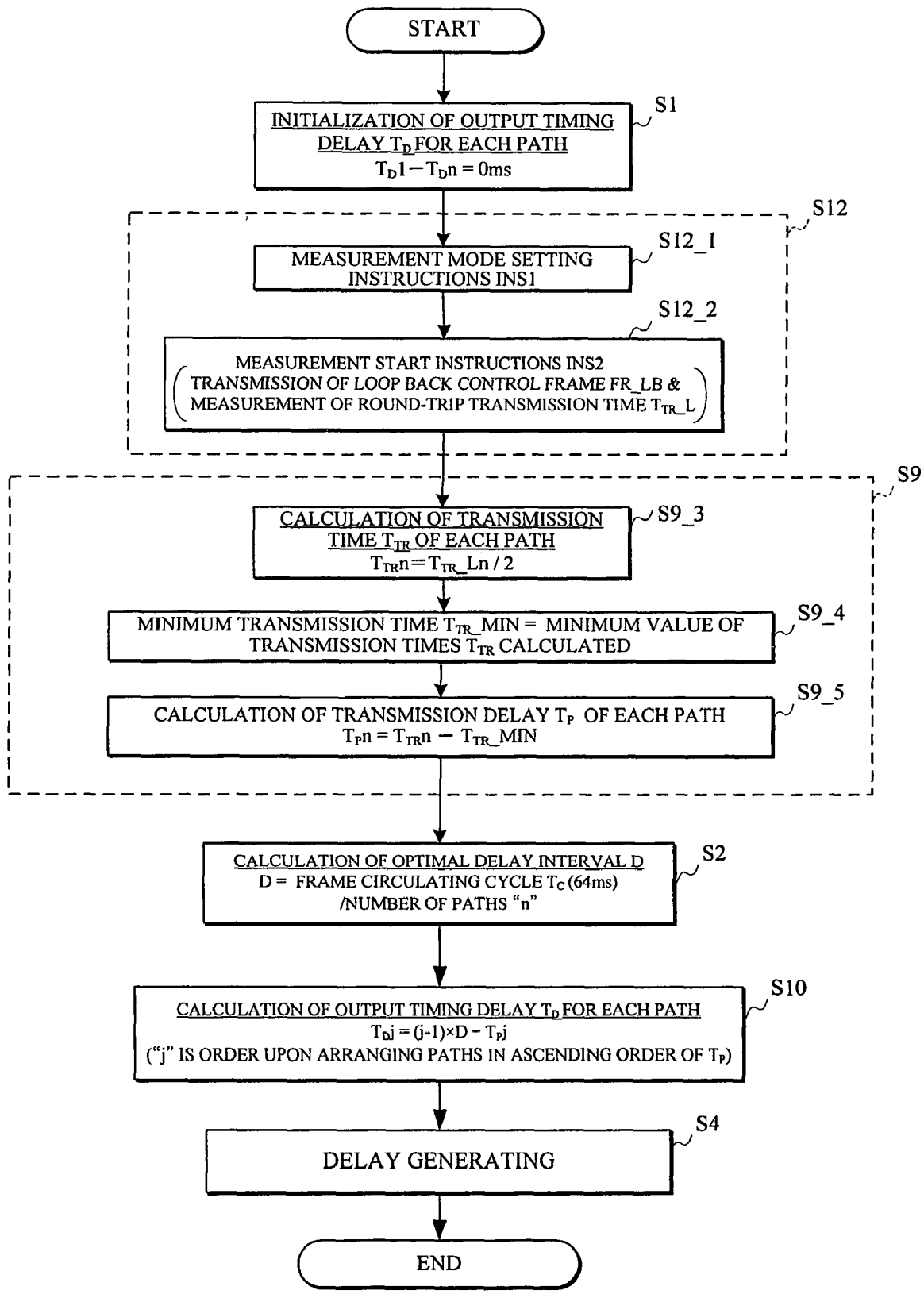
FIG. 22 is a flowchart showing an overall operation example of a transmission device on a path status transmitting side used for an embodiment [7] of a path status monitoring method and device according to the present invention.
Figure 23:
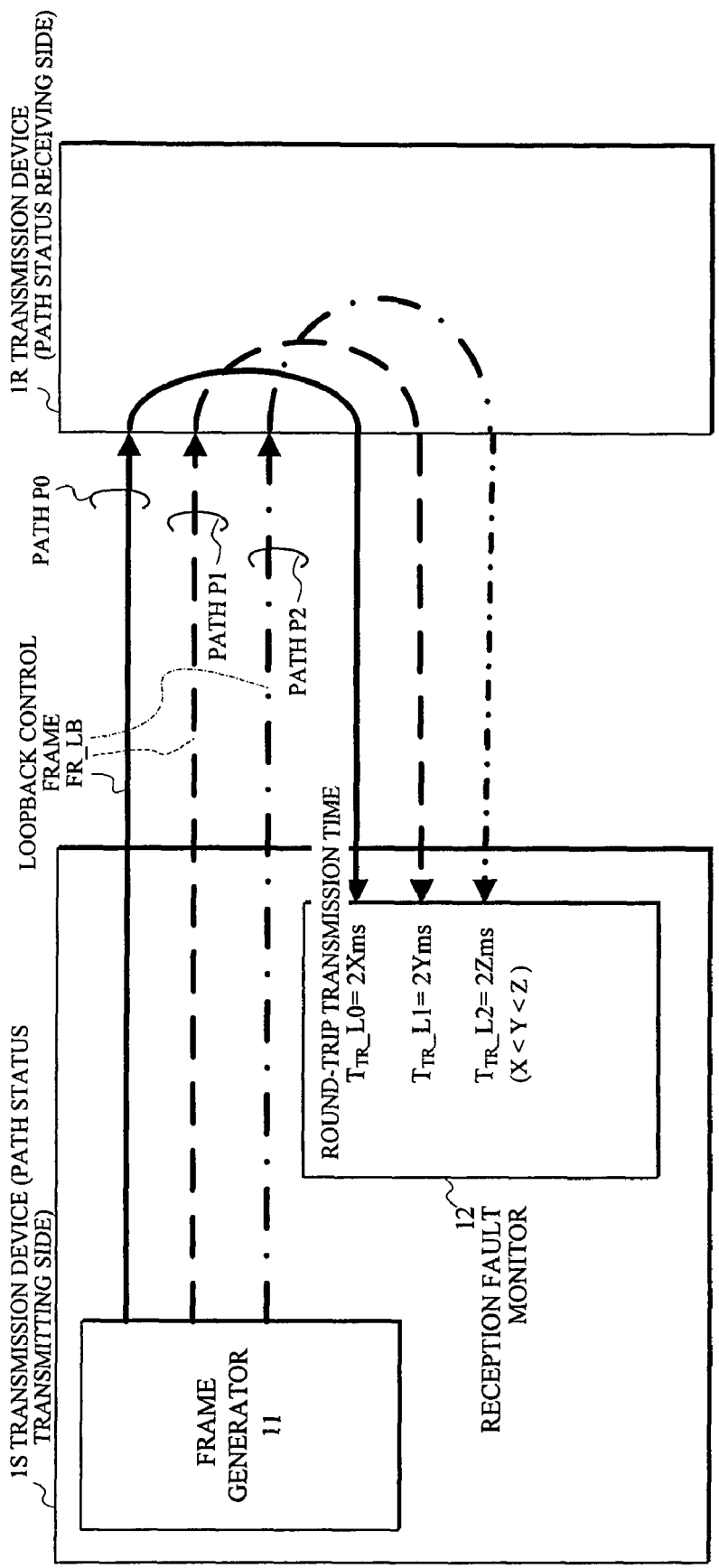
FIG. 23 is a block diagram showing a measurement example of a round-trip transmission time in a transmission device on a path status transmitting side used for an embodiment [7] of a path status monitoring method and device according to the present invention.
Figure 24A:
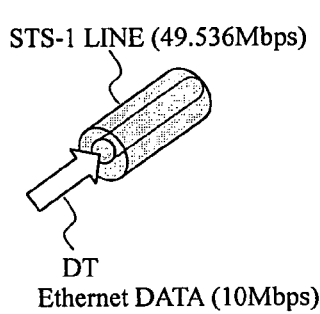
FIGS. 24A-24C are diagrams showing a general transmission example [1] of an EoS.
Figure 24B:
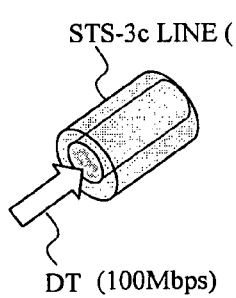
Figure 24C:
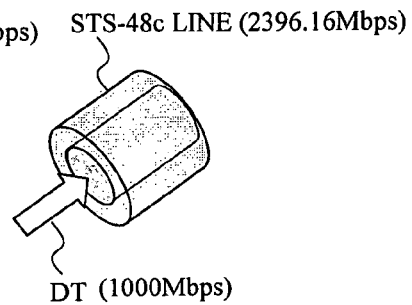
Figure 25:
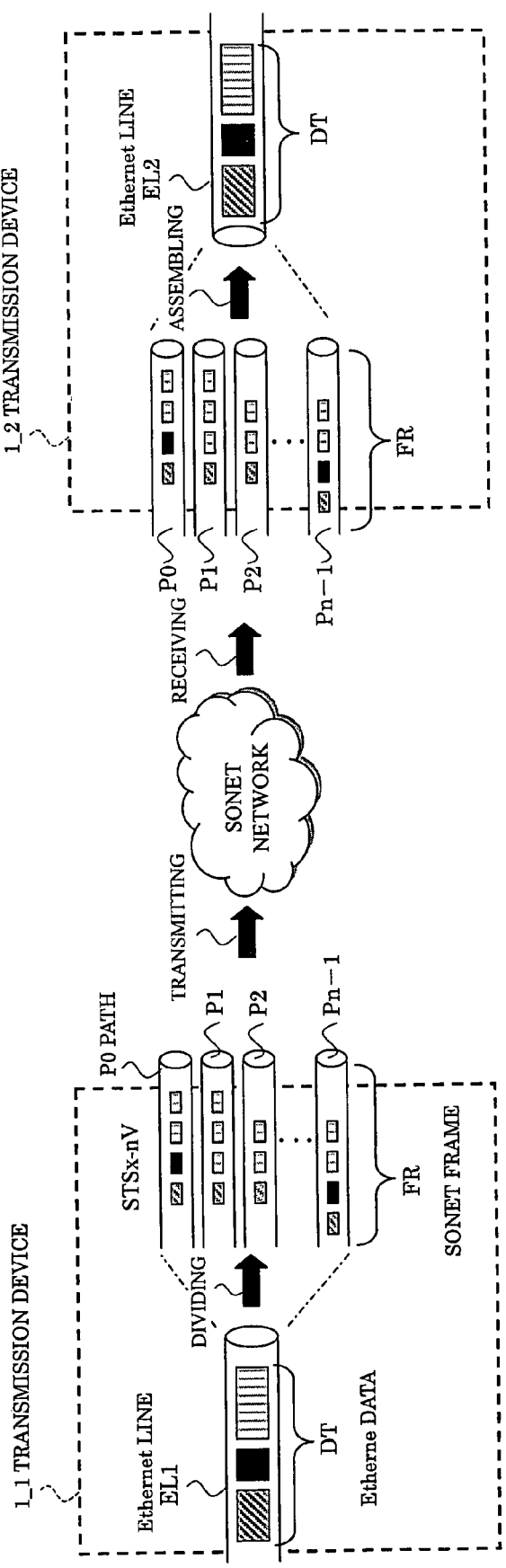
FIG. 25 is a diagram showing a general transmission example [2] of an EoS.

Embodiments [1]-[7] of the path status monitoring method and the device using the method according to the present invention will now be described referring to FIGS. 1-23 in the following order:

I. Embodiment [1]: FIGS. 1-3
I.1. Arrangement: FIG. 1
I.2. Operation example: FIGS. 2 and 3
I.2.A. Overall operation example of transmission device 1S: FIG. 2
I.2.B. Delay generating example: FIG. 3
II. Embodiment [2]: FIGS. 4-6
II.1. Arrangement: FIG. 4
II.2. Operation example: FIGS. 5 and 6
II.2.A. Overall operation example of transmission device 1S: FIG. 5
II.2.B. Delay generating example: FIG. 6
III. Embodiment [3]: FIGS. 7 and 8
III.1. Arrangement: FIG. 7
III.2. Operation example: FIG. 8
IV. Embodiment [4]: FIGS. 9-13B
IV1. Arrangement: FIGS. 9 and 10
IV.2. Operation example: FIGS. 11A-13B
IV.2.A. Operation example (1): FIGS. 11A, 11B, and 12
IV.2.B. Operation example (2): FIGS. 13A and 13B
V. Embodiment [5]: FIGS. 14-16
V.1. Arrangement: FIG. 14
V.2. Operation example: FIGS. 15 and 16
VI. Embodiment [6]: FIGS. 17-20
VI.1. Arrangement: FIG. 17
VI.2. Operation example: FIGS. 18A-20
VI.2.A. Embodiment (1) of transmission delay notifying portion: FIGS. 18A and 18B
VI.2.B. Embodiment (2) of transmission delay notifying portion: FIGS. 19A and 19B
VI.2.C. Overall operation example of transmission device 1S: FIG. 20
VII. Embodiment [7]: FIGS. 21-23
VII.1. Arrangement: FIG. 21
VII.2. Operation example: FIGS. 22 and 23

I. Embodiment [1]

FIGS. 1-3

I.1. Arrangement: FIG. 1

Transmission devices 1S and 1R according to the embodiment [1] of the present invention shown in FIG. 1 are mutually connected by physical paths P0-P2 which are formed of "3" pieces of STS lines, and composed of Ethernet interfaces 10S and 10R respectively comprising terminals of the paths P0-P2 and operating as interfaces on an Ethernet network (not shown) side, SONET interfaces 20S and 20R arranged in the paths P0-P2 and respectively operating as interfaces on a SONET network (not shown) side, and controllers 30S and 30R respectively controlling the interfaces 10S and 20S, and the interfaces 10R and 20R.

Figures 31A, 31B:
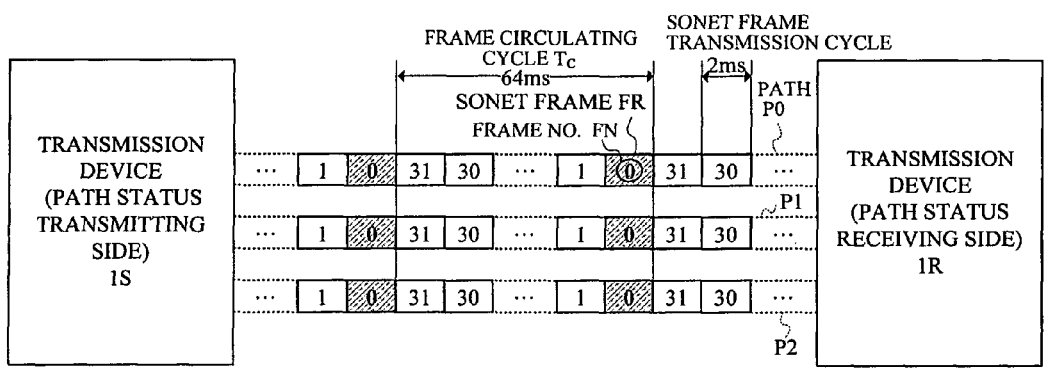
FIGS. 31A and 31B are diagrams showing a prior art example of a path status monitoring.

Also, the Ethernet interface 10S within the transmission device 10S has a frame generator 11 cyclically generating the same SONET frames FR as the prior art example shown in FIGS. 31A and 31B respectively for the paths P0-P2, a reception fault monitor 12 monitoring a reception fault which occurs in each of the paths P0-P2, and a delay generator 13 shifting phases of the frames FR outputted from the frame generator 11 between the paths P0-P2 according to an output timing delay $T_D$ calculated by the controller 30S based on the number of paths P0-P2 "3", acquiring the path statuses MST which indicates the statuses of the reception fault occurrence in the paths P0-P2 from the reception fault monitor 12 upon transmitting the frames FR through each of the paths P0-P2, and storing the path statuses MST acquired in the frames FR.

It is to be noted that while being omitted in the figures, the above-mentioned blocks 11-13 are also provided in the Ethernet interface 10R within the transmission device 1R, so that each other's path statuses MST can be monitored between the transmission devices 1S and 1R.

Also, in this embodiment as well as embodiments [2]-[7] which will be described later, the transmission devices 1S and 1R are respectively assumed as being on the transmitting side and the receiving side of the path status MST for the sake of simplifying the description. Even when the transmitting side and receiving side are exchanged, the following description is similarly applied only with the signal flow being reversed.

I.2. Operation Example: FIGS. 2 and 3

An operation of this embodiment will now be described. Firstly, an overall operation of the transmission device 1S will be described referring to FIG. 2. Then, one embodiment of processing where the phases of the frames FR are shifted between the paths P0-P2 performed by the delay generator 13 (hereinafter, referred to as delay generating) will be described referring to FIG. 3.

I.2.A. Overall Operation Example of Transmission Device 1S: FIG. 2

As shown in FIG. 2, the controller 30S firstly sets output timing delays $T_D0$-$T_D2$ for the paths P0-P2 with "0 ms" to be initialized in advance of all processing (at step S1).

Then, the controller 30S divides the circulating cycle Tc="64 ms" of the SONET frames FR by the number of the paths P0-P2 "n"="3", thereby obtaining an optimal time interval (hereinafter, referred to as optimal delay interval) D="21 ms" (in this example, the number of digits after the decimal point is truncated) between the output timing delays $T_D0$-$T_D2$ (at step S2).

The controller 30S calculates each of the output timing delays $T_D0$-$T_D2$ by using the optimal delay interval D as expressed in the following Eq.(1) to be provided to the delay generator 13 (at step S3).

$$T_Dn = \text{adjacent order } AS \text{ for reference path between paths} \times \text{optimal delay interval } D \quad \text{Eq.(1)}$$

Supposing that the path P0 is the reference path (adjacent order AS="0"), the adjacent orders AS of the paths P1 and P2 are respectively "1" and "2". Therefore, the output timing delays $T_D0$, $T_D1$, and $T_D2$ are respectively calculated as "0 ms", "21 ms", and "42 ms".

The delay generator 13 performs the delay generating which will be described hereinbelow according to the output timing delays $T_D0$-$T_D2$ (at step S4).

I.2.B. Delay Generating Example: FIG. 3

As shown in FIG. 3, the delay generator 13 firstly stores the SONET frames FR outputted from the frame generator 11 to the paths P0-P2 in memories MEM0-MEM2 provided in the paths P0-P2.

It is supposed that the frame Nos. FN ("0"-"31") are respectively assigned to the frames FR in the same way as those of FIG. 31A, the frames FR are cyclically generated in the frame circulating cycle Tc, and the path statuses MST are stored in the frames FR according to the relationship with the frame Nos. FN shown in FIG. 31B.

Since the output timing delay $T_D0$ for the path P0 is "0 ms" at this time, the delay generator 13 immediately acquires from the reception fault monitor 12 (omitted in FIG. 3) the path statuses MST to be stored in the frame whose frame No. FN="0" having been stored in the memory MEM0. Then, the delay generator 13 reads from the memory MEM0 the frames FR to be provided to the SONET interface 20S, thereby transmitting the frames FR through the path P0.

Thus, the frames FR for the path P0 are transmitted without delay.

When the output timing delay $T_D1$ (=21 ms) elapses from the transmission of the frames FR to the path P0, the delay generator 13 stores the path statuses MST acquired at this time in the frame whose frame No. FN="0" having been stored in the memory MEM1, and then reads from the memory MEM1 the frames FR to be provided to the SONET interface 20S.

Thus, the phases of the frames FR transmitted through the path P1 are shifted from those of the frames FR having been transmitted through the path P0 by the optimal delay interval D.

When the output timing delay $T_D2$ (=42 ms) elapses from the transmission of the frames FR to the path P0, the delay generator 13 stores the path statuses MST acquired at this time in the frame whose frame No. FN="0" having been stored in the memory MEM2, and then reads from the memory MEM2 the frames FR to be provided to the SONET interface 20S.

Thus, the phases of the frames FR transmitted through the path P2 are shifted from those of the frames FR having been transmitted through the path P1 by the optimal delay interval D.

Thereafter, the delay generator 13 repeatedly executes the above-mentioned processing to the frames FR sequentially generated in the paths P0-P2.

II. Embodiment [2]

FIGS. 4-6

II.1. Arrangement: FIG. 4

Transmission devices 1S and 1R according to the embodiment [2] of the present invention shown in FIG. 4 are different from those of the above-mentioned embodiment [1] in that the controller 30S also acquires the path status MST from the reception fault monitor 12 in addition to the delay generator 13.

II.2. Operation Example: FIGS. 5 and 6

An operation of this embodiment will now be described. Firstly, an overall operation of the transmission device 1S will be described referring to FIG. 5. Then, one embodiment of delay generating by the delay generator 13 will be described referring to FIG. 6.

II.2.A. Overall Operation Example of Transmission Device 1S: FIG. 5

A flowchart shown in FIG. 5 is changed so as to execute steps S5-S7 instead of the processing of the steps S2 and S3 shown in FIG. 2 and to repeatedly execute the steps S4-S7.

Namely, the controller 30S acquires the path statuses MST from the reception fault monitor 12 in advance of the calculation of the output timing delays $T_D0$-$T_D2$ for the paths P0-P2, thereby recognizing normal paths within the paths P0-P2 and the number thereof (at step S5).

Supposing that a reception fault has occurred in the path P1 as shown in FIG. 6, the controller 30S (not shown) recognizes the number of normal paths "k" as "2", and obtains the optimal delay interval D="32 ms" between the output timing delays $T_D0$ and $T_D2$ for the normal paths P0 and P2 by dividing the frame circulating cycle Tc (64 ms) by the number of normal paths "k" (at step S6).

The controller 30S calculates the output timing delays $T_D0$ and $T_D2$ as expressed in the following Eq.(2) to be provided to the delay generator 13 (at step S7).

$$T_Dk=\text{adjacent order } ASk \text{ for reference path between normal paths} \times \text{optimal delay interval } D \qquad \text{Eq.(2)}$$

Supposing that the path P0 is the reference path (adjacent order ASk="0"), the adjacent order ASk of the path P2 is "1". Therefore, the output timing delays $T_D0$ and $T_D2$ are respectively calculated as "0 ms" and "32 ms".

Also, the output timing delay $T_D1$ for the path P1 where a reception fault has occurred is not updated at the above-mentioned step S7 and maintains the value ("21 ms" in the example of FIG. 6) before the occurrence of the reception fault.

The delay generator 13 performs the delay generating (generation processing) which will be described hereinbelow according to the output timing delays $T_D0$-$T_D2$ (at step S4).

Also, the controller 30S repeatedly executes the above-mentioned steps S5-S7 while the delay generating is performed by the delay generator 13, thereby updating the output timing delays $T_D0$-$T_D2$ every time a reception fault occurs in each of the paths P0-P2 or recovers.

II.2.B. Delay Generating Example: FIG. 6

As shown in FIG. 6, the delay generator 13 firstly stores the SONET frames FR outputted from the frame generator 11 to the paths P0-P2 in the memories MEM0-MEM2 in the same way as the above-mentioned embodiment [1].

Since the output timing delay $T_D0$ for the path P0 is "0 ms" at this time, the delay generator 13 transmits the frames FR to the path P0 without delay in the same way as the above-mentioned embodiment [1].

When the output timing delay $T_D1$ (=21 ms) elapses from the transmission of the frames FR to the path P0, the delay generator 13 transmits the frames FR to the path P1 in the same way as the above-mentioned embodiment [1]. However, since the output timing delay $T_D1$ has a value before the occurrence of the reception fault, the phase difference between the frame FR transmitted to the path P1 and the frame FR transmitted to the path P0 is different from the optimal delay interval D.

When the output timing delay $T_D2$ (=32 ms) elapses from the transmission of the frames FR to the reference path P0, the delay generator 13 transmits the frames FR to the path P2 in the same way as the above-mentioned embodiment [1].

Thus, the phases of the SONET frames FR transmitted to the path P2 are shifted from those of the SONET frames FR having been transmitted to the path P0 by the optimal delay interval D.

III. Embodiment [3]

FIGS. 7 and 8

III.1. Arrangement: FIG. 7

Transmission devices 1S and 1R according to the embodiment [3] of the present invention shown in FIG. 7 are different from those of the above-mentioned embodiment [1] in that the devices are mutually connected by "n" pieces of paths P0-Pn-1, and the paths P0-Pn-1 are divided into path groups PG1-PGm per 32 paths.

III.2. Operation Example: FIG. 8

In operation, the transmission device 1S on the transmitting side of the path status MST executes the processing of the steps S1-S4 shown in FIG. 2 for each of the path groups PG1-PGm.

Thus, the SONET frames FR are transmitted through each of the paths P0-Pn-1 with the phases shifted between the paths among each of the path groups PG1-PGm by the optimal delay interval D as shown in FIG. 8.

In this example, since the paths P0-Pn-1 are divided into the path groups per 32 paths, the phases of the frames FR become identical between paths separated per 32 paths as shown in FIG. 8.

For example, when the reception fault has occurred in the path P1 in a case where the transmission device 1R on the receiving side of the path status MST monitors the path statuses MST by using the frames FR received through the paths P0-P31 among the path group PG1, the transmission device 1R extracts the path statuses MST from the frames FR received through the path P33 among the path group PG2. Similarly, the transmission device 1R can receive the frames FR with the same phases as those of the path P1 not only from the path among the path group PG2 but also from paths directly adjacent to reference paths among other path groups PG3-PGm.

It is to be noted that when the reception fault of the path P1 has recovered, the transmission device 1R may extract the path statuses MST from the frames FR received through the path P1 again, or continue to extract the path statuses MST from the frames FR received through the path P33 which was substituted for the path P1 upon the occurrence of the reception fault.

IV. Embodiment [4]

FIGS. 9-13B

IV.1. Arrangement: FIGS. 9 and 10

Transmission devices 1S and 1R according to the embodiment [4] of the present invention shown in FIG. 9 are different from those of the above-mentioned embodiment [1] in that the devices are mutually connected by "n" pieces of paths P0-Pn-1, and the controller 30S provides to the delay generator 13 a transmission No. TN in addition to the output timing delay $T_D$.

It is to be noted that the paths P0-Pn-1 may be divided into the path groups per a predetermined number of paths in the same way as the above-mentioned embodiment [3].

The transmission No. TN is designed for informing the transmission device 1R on the receiving side of the path status MST of a transmission order of the frames FR to the paths P0-Pn-1, and is intended to address a reversed appearance of an arrival order of the path statuses MST as shown in FIG. 10.

Namely, in the transmission device 1S, the transmission order of the frames FR coincides with the event order of the occurrence of the reception fault in each of the paths P0-Pn-1 or the recovery thereof. However, in the transmission device 1R, the reception order of the frames FR may not coincide with the event order of the occurrence of the reception fault in each of the paths P0-Pn-1 or the recovery thereof due to differences in length of the paths P0-Pn-1 or the like.

For example, when the transmission device 1R receives the frames FR in order of the path P0→P2→P1 in a case where no reception fault occurred in the path P0 upon the transmission of the frames FR to the paths P0 and P1 (namely, the path status MST0 of the path P0 was "OK") but the reception fault has occurred in the path P0 upon the transmission of the frames FR to the path P2 (namely, the path status MST0 has transited from "OK" to "FAULT") as shown in FIG. 10, the transmission device 1R firstly refers to the path status MST0 stored in the frames FR received through the path P0, thereby recognizing that no reception fault has occurred in the path P0 on the transmission device 1S side.

Then, the transmission device 1R recognizes that the reception fault has occurred in the path P0 based on the path status MST0 having received through the path P2. However, the transmission device 1R erroneously recognizes based on the path status MST0 having subsequently received through the path P1 that the reception fault of the path P0 has recovered.

Therefore, the transmission device 1S assigns the transmission Nos. TN to the frames FR transmitted through each of the paths P0-Pn-1 as will be described hereinbelow, thereby informing the transmission device 1R of the transmission order of the frames FR.

IV.2. Operation Example: FIGS. 11A-13B

An operation of this embodiment will now be described. Firstly, an operation example (1) in a case where the paths P0-Pn-1 are not divided into the path groups will be described referring to FIGS. 11A, 11B, and 12. Then, another operation example (2) in a case where the paths P0-Pn-1 are divided into the path groups will be described referring to FIGS. 13A and 13B.

IV.2.A. Operation Example (1): FIGS. 11A, 11B, and 12

As shown in FIG. 11A, the transmission device 1S transmits the SONET frames FR which are shifted by the optimal delay interval D between the paths P0-Pn-1 by executing the processing of the steps S1-S4 shown in FIG. 2, whereas upon the transmission, the transmission device 1S stores the transmission Nos. TN in the frames FR as follows:

The controller 30S within the transmission device 1S provides to the delay generator 13 the transmission No. TN incremented by "1" in order of the transmission of the frames FR to the paths P0-Pn-1 (namely, in ascending order of the output timing delay $T_D$ for each of the paths P0-Pn-1 calculated at the step S3 in FIG. 2).

The delay generator 13 (not shown in FIG. 11A) stores the transmission No. TN in the frames FR transmitted through each of the paths P0-Pn-1. As shown in FIG. 12 for example, the transmission No. TN is set in bits 1-4 ("Reserved" in FIG. 32) of lines where the multi-frame indicator MFI of the H4 byte within the path overhead of the frame FR indicates "1011"-"1101" (namely, the "11th"-"13th" lines).

Thus, the transmission No. TN="1" is assigned to the frames FR transmitted through the path P0. Similarly, the transmission Nos. TN="2"-"n" are respectively assigned to the frames FR transmitted through the paths P1-Pn-1.

The transmission device 1R receives the frames FR to which the transmission Nos. TN are assigned as shown in FIG. 11B. Namely, the transmission device 1R firstly determines whether or not the reception fault has occurred in the paths P0-Pn-1 on its own side (at step R1).

As a result, when determining that no reception fault has occurred in any of the paths P0-Pn-1, the transmission device 1R extracts the path statuses MST from the frames FR in order of the transmission No. TN assigned to each of the frames FR having been received through each of the paths P0-Pn-1 (at step R2).

Thus, even when the reversed appearance of the arrival order of the path statuses MST as shown in FIG. 10 has occurred, the transmission device 1R can accurately recognize the reception fault of each of the paths P0-Pn-1 which occurs on the transmission device 1S side or the recovery thereof in order of the event.

On the other hand, when determining that the reception fault has occurred in any one of the paths P0-Pn-1, the transmission device 1R renders the transmission No. TN corresponding to the abnormal path where the reception fault has occurred an unassigned number, and extracts the path statuses MST from the frames FR according to the transmission Nos. TN corresponding to the normal paths (at step R3).

In this case, the transmission device 1S need not perform redundant processing such as standing by for the recovery of the reception fault in the abnormal path.

Thereafter, the transmission device 1R repeatedly executes the above-mentioned step R2 or R3 according to the statuses of a reception fault occurrence in the paths P0-Pn-1.

IV.2.B. Operation Example (2): FIGS. 13A and 13B

FIG. 13A shows an operation example in a case where the paths P0-Pn-1 are divided into the path groups PG1-PGm per 32 paths in the same way as the above-mentioned embodiment [3]. In this case, the frames FR to which the same transmission No. TN is assigned between paths separated per 32 paths as shown in FIG. 13A are transmitted from the transmission device 1S.

As shown in FIG. 13B, the transmission device 1R determines, different from the above-mentioned operation example (1), whether or not the reception fault has occurred in each path among a predetermined path group on its own side (at step R4). For example, in the case where the path statuses MST are monitored by using the frames FR received through the paths P0-P31 among the path group PG1 in the same way as the above-mentioned embodiment [3], the transmission device 1R determines whether or not the reception fault has occurred in the paths P0-P31.

As a result, when determining that no reception fault has occurred in any of the paths P0-P31, the transmission device 1R extracts the path statuses MST from the frames FR in order of the transmission No. TN assigned to each of the frames FR having been received through each of the paths P0-P31 (at step R5).

On the other hand, when a reception fault has occurred in e.g. the path P1, the transmission device 1R receives the frames FR to which the same transmission No. TN="2" is assigned through the path P33 among the path group PG2, and extracts the path statuses MST therefrom (at step R6).

Thus, even when the reversed appearance of the arrival order of the path statuses MST shown in FIG. 10 has occurred and the reception fault has occurred on its own side, the transmission device 1R can accurately recognize the reception fault of each of the paths P0-Pn-1 which occurs on the transmission device 1S side or the recovery thereof in order of the event.

V. Embodiment [5]

FIGS. 14-16

V.1. Arrangement: FIG. 14

Transmission devices 1S and 1R according to the embodiment [5] of the present invention shown in FIG. 14 are different from those of the above-mentioned embodiment [1] in that the reception fault monitor 12 extracts from the SONET frames FR received through each of the paths P0-P2 path statuses MST_R on the transmission device 1R side to be provided to the controller 30S, and that the devices have the frames FR pass through a relay device 2_1 upon transmitting or receiving the frames FR through the paths P0 and P1 and have the frames FR pass through a relay device 2_2 upon transmitting and receiving the frames FR through the path P2.

Also, the relay devices 2_1 and 2_2 respectively have SONET interfaces 20_11 and 20_21 on the transmission device 1S side, and SONET interfaces 20_12 and 20_22 on the transmission device 1R side. In accordance with these interfaces, SONET interfaces 20S_1 and 20S_2, and 20R_1 and 20R_2 are respectively provided two by two within the transmission devices 1S and 1R.

Also, transmission rate standards of the interfaces 20_11, 20_12, 20_21, and 20_22 are respectively different from each other such as "OC12", "OC48", "OC3", and "OC12".

Namely, under the actual operating environment, a communication condition for each of the paths P0-P2 may be different, so that transmission delays occur in the frames FR between the paths P0-P2 due to the differences in the transmission rate standards between the transmission device and the relay device as mentioned above, processing congestion in the relay device, and the like.

This embodiment deals with a case where the phases of the frames FR are shifted between the paths P0-P2 in view of the transmission delay.

V.2. Operation Example: FIGS. 15 and 16

A flowchart shown in FIG. 15 is changed, in which steps S8 and S9 are added between the processing of the steps S1 and S2 shown in FIG. 2, so as to execute step S10 instead of the processing of the step S3.

Namely, the transmission device 1S can not directly recognize the transmission delays arising between the paths P0-P2 since only transmission device 1R can recognize the transmission delays. Therefore, at step S8, a maximum transmission delay which the transmission device 1R can allow with respect to each of the paths P0-P2 (hereinafter, referred to as allowable transmission delay) is measured, and at step S9, the transmission delay of each of the paths P0-P2 is indirectly obtained based on the allowable transmission delay measured.

Then, at step S10, the output timing delays $T_D0$-$T_D2$ for the paths P0-P2 are calculated by using the transmission delays obtained.

Firstly, the controller 30S within the transmission device 1S provides the output timing delays $T_D0$-$T_D2$ for the paths P0-P2 initialized with "0 ms" at the step S1 to the delay generator 13, thereby having the delay generator 13 execute the delay generating (at step S8_1).

Thus, the SONET frames FR are transmitted through the paths P0-P2 with the same phases.

In this case, as shown in FIG. 16, only transmission delays due to the difference in the communication condition for each of the paths P0-P2 occur between the paths P0-P2. It is now supposed that in the transmission device 1R, transmission delays $T_P1$ and $T_P2$ which are respectively "α ms" and "β ms" occur in the paths P1 and P2 on the basis of the path P0 where the frames FR are received earliest (transmission delay $T_P0$="0 ms").

Figure 26A:
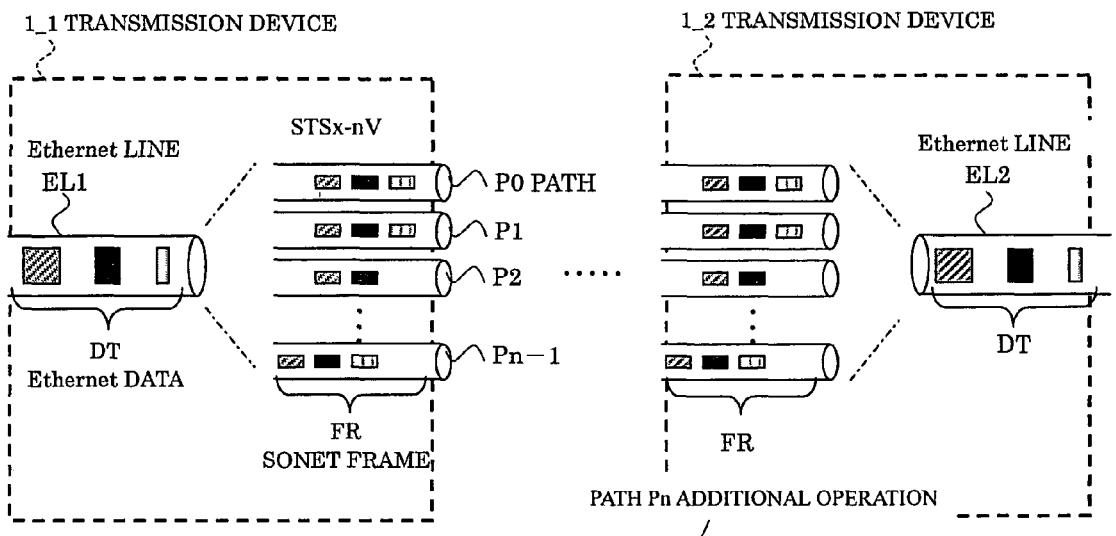
FIGS. 26A and 26B are diagrams showing an LCAS control example (1)
Figure 26B:
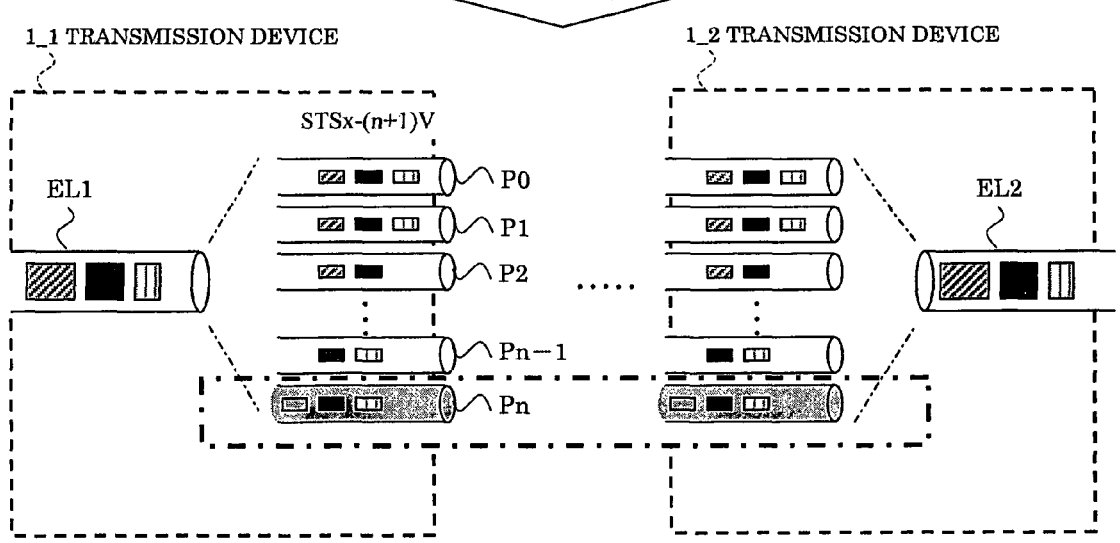
Figure 27:
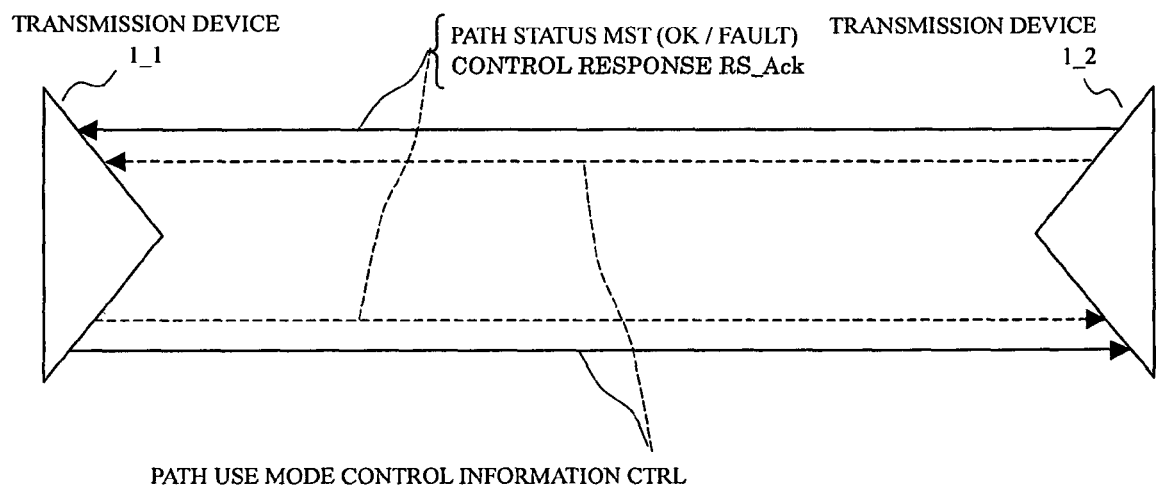
FIG. 27 is a diagram showing a transmission and reception example of LCAS control information.
Figure 28A:
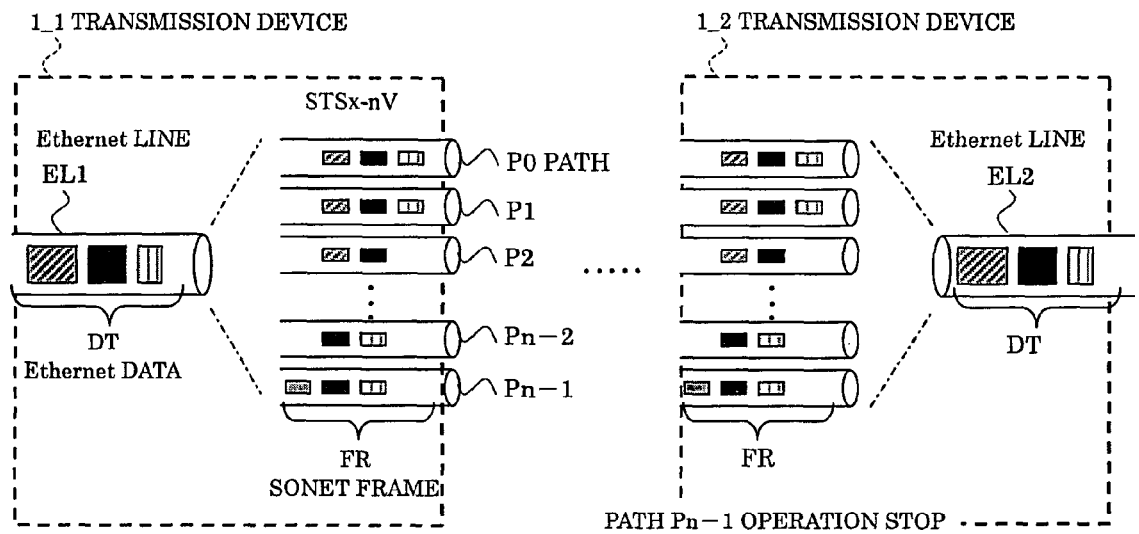
FIGS. 28A and 28B are diagrams showing an LCAS control example (2)
Figure 28B:
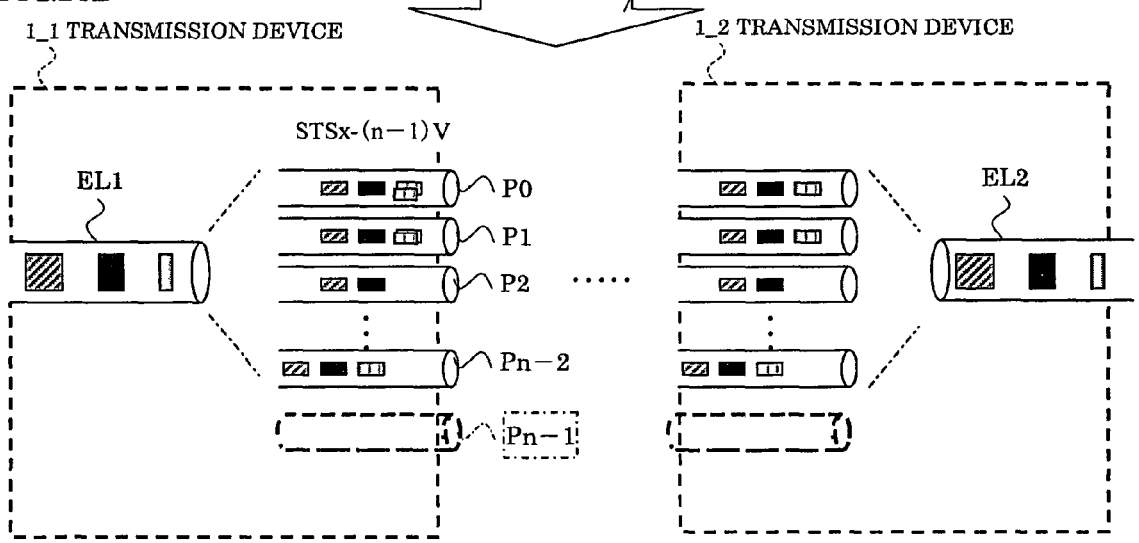
Figure 29A:
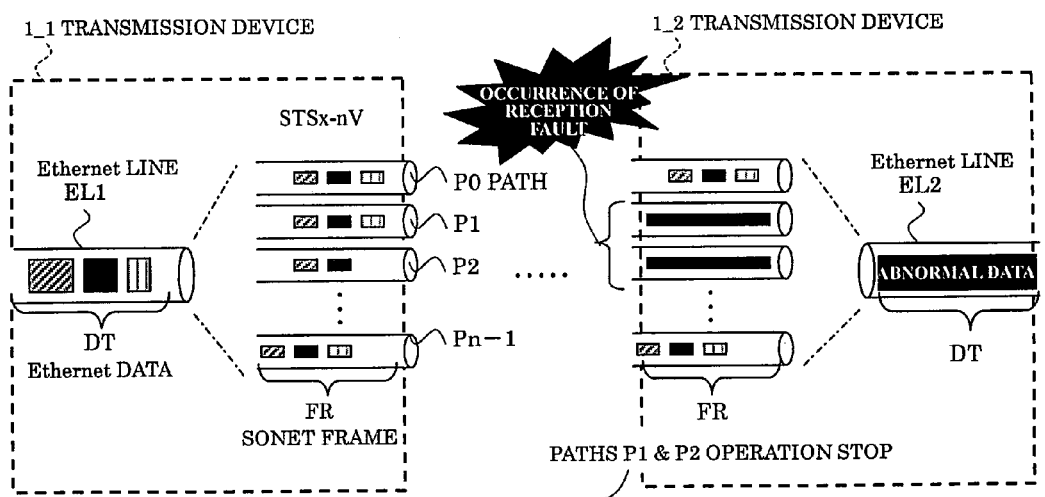
FIGS. 29A and 29B are diagrams showing an LCAS control example (3)
Figure 29B:
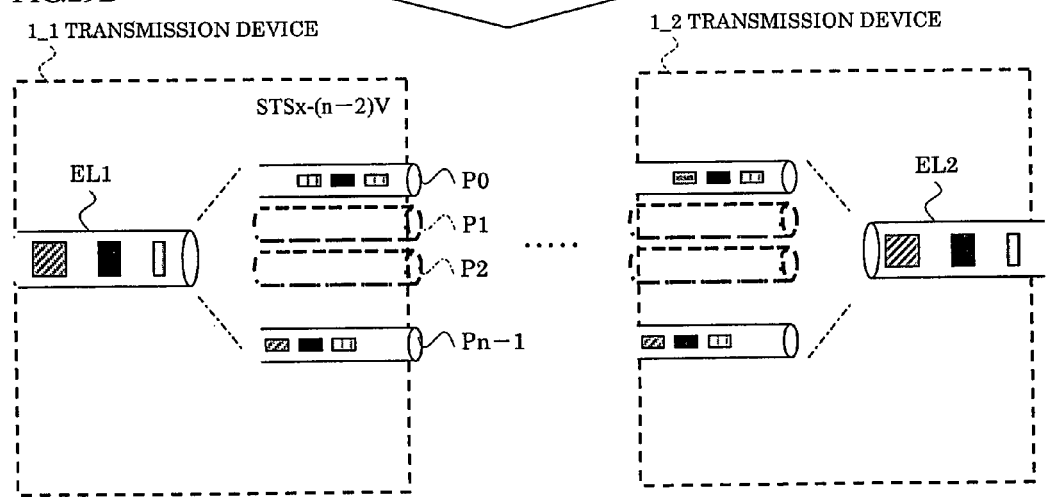
Figure 30A:
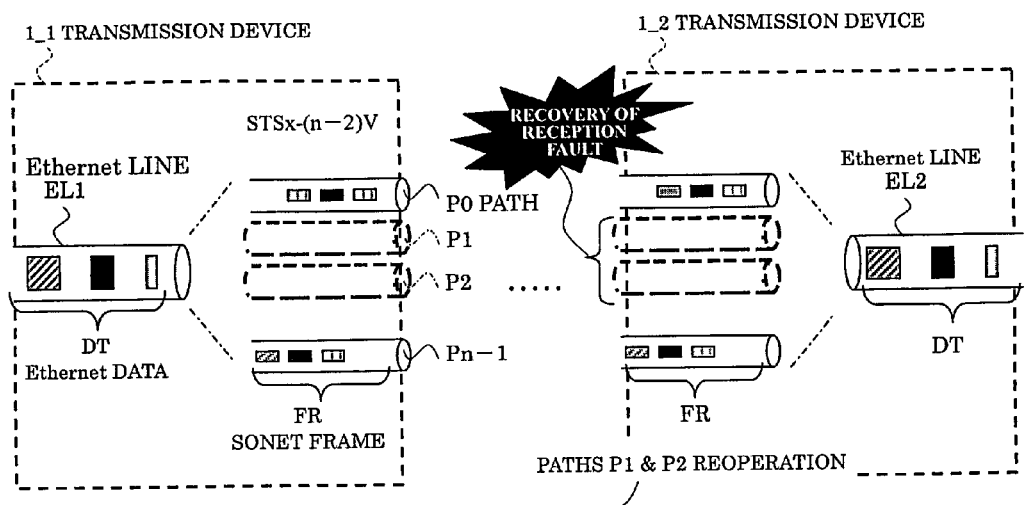
FIGS. 30A and 30B are diagrams showing an LCAS control example (4)
Figure 30B:
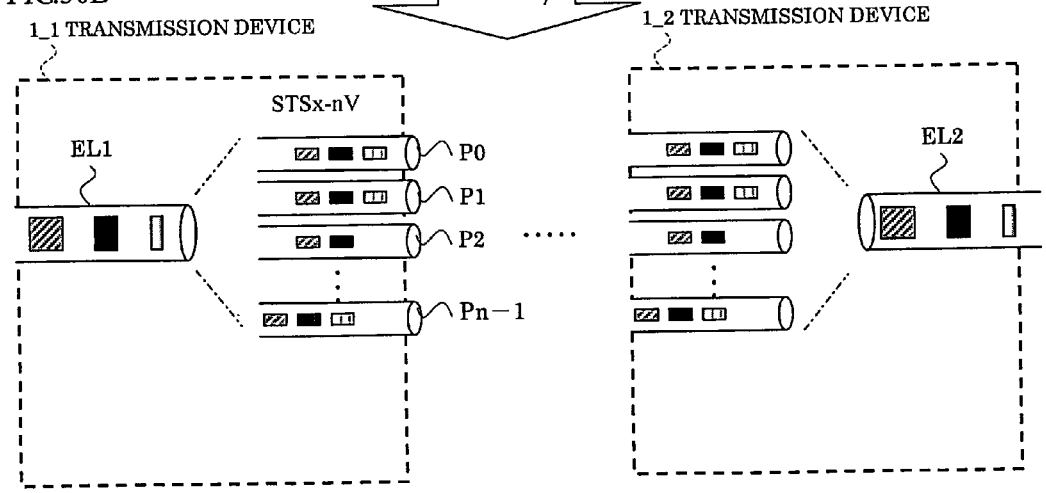

Unless these transmission delays $T_P0$-$T_P2$ exceed a maximum value $T_{A\_MAX}$ of the allowable transmission delays (hereinafter, referred to as maximum allowable transmission delay), the transmission device 1R absorbs the delays as shown in FIG. 16, thereby enabling frame processing (e.g. assembling of Ethernet data DT shown in FIGS. 26A and 26B) to be normally executed.

The controller 30S increases the output timing delay $T_D0$ for the path P0 (e.g. adds "1 ms" thereto) (at step S8_2), and then provides the output, timing delay $T_D0$ to the delay generator 13, thereby having the delay generator 13 execute the delay generating for the path P0 (at step S8_3).

Thus, the transmission delay $T_P0$ of the path P0 in the transmission device 1R is increased by the output timing delay $T_D0$ from the original transmission delay $T_P0$.

During this time, the reception fault monitor 12 extracts from the frames FR the path statuses MST_R to be provided to the controller 30S every time the frames FR are received through each of the paths P0-P2 from the transmission device 1R. The controller 30S determines whether or not the reception fault has occurred in the path P0 at the transmission device 1R by referring to the path statuses MST_R (at step S8_4).

When the transmission delay $T_P0$ exceeds the maximum allowable transmission delay $T_{A\_MAX}$, "FAULT" is set to the path status MST_R0 of the path P0. This is because the transmission device 1R can not accurately execute the above-mentioned frame processing, thereby deeming that the reception fault has occurred in the path P0.

The controller 30S repeatedly executes the above-mentioned steps S8_2-S8_4 until detecting that the reception fault has occurred in the path P0 at the transmission device 1R (namely, until the path status MST_R0 assumes to indicate "FAULT"), and measures the output timing delay $T_D0$ at the time when the path status MST_R0 indicates "FAULT" as the allowable transmission delay $T_A0$ of the path P0 (at step S8_5).

In the example of FIG. 16, the path P0 is the reference path where the transmission delay is most allowable, so that the allowable transmission delay $T_A0$ is measured as a time equal to the maximum allowable transmission delay $T_{A\_MAX}$.

The controller 30S cancels the output timing delay for the path P0 by resetting the transmission delay $T_D0$ to "0 ms" (at step S8_6), and then determines whether or not the measurement of the allowable transmission delays $T_A0$-$T_A2$ of all of the paths P0-P2 has been completed (at step S8_7).

Since only measurement of the allowable transmission delay $T_A0$ has now been completed, the controller 30S repeatedly executes the above-mentioned steps S8_2-S8_7, thereby performing the measurement of the allowable transmission delays $T_A1$ and $T_A2$.

Thus, the allowable transmission delays $T_A1$ and $T_A2$ are respectively measured as time intervals ("$T_{A\_MAX}$—α ms" and "$T_{A\_MAX}$—β ms") up to the maximum allowable transmission delay $T_{A\_MAX}$ where the transmission delays are further allowable from the transmission delays $T_P1$ and $T_P2$ as shown in FIG. 16.

On the other hand, when the measurement of the allowable transmission delays $T_A0$-$T_A2$ of all of the paths P0-P2 has been completed, the controller 30S regards a maximum value within the allowable transmission delays $T_A0$-$T_A2$ measured as the maximum allowable transmission delay $T_{A\_MAX}$ (at step S9_1). In this example, the maximum allowable transmission delay $T_{A\_MAX}$ is the allowable transmission delay $T_A0$ of the path P0.

Then, the controller 30S obtains the transmission delays $T_P0$-$T_P2$ by subtracting the respective allowable transmission delays $T_A0$-$T_A2$ from the maximum allowable transmission delay $T_{A\_MAX}$ (at step S9_2). In this example, the transmission delay $T_P0$ is calculated as "0 ms" and the transmission delays $T_P1$ and $T_P2$ are respectively calculated as "α ms" and "β ms".

The controller 30S obtains the optimal delay interval D (="21 ms") at the step S2 in the same way as the above-mentioned embodiment [1], and then calculates the output timing delays $T_D0$-$T_D2$ as expressed in the following Eq.(3) to be provided to the delay generator 13 (at step S10).

$$T_D j = (j-1) \times \text{optimal delay interval } D - \text{transmission delay } T_P j \quad \text{Eq.(3)}$$

Where "j" is an order upon arranging the paths P0-P2 in ascending order of the transmission delay $T_P$. In this example, since it is given that transmission delay $T_P0$<transmission delay $T_P1$<transmission delay $T_P2$, the orders "j" of the paths P0-P2 respectively assume "1", "2", and "3".

Accordingly, the output timing delays $T_D0$, $T_D1$, and $T_D2$ are respectively calculated as "0 ms" (0×"21 ms"-"0 ms"), "21-α ms" (1×"21 ms"-"α ms"), and "42-β ms" (2×"21 ms"-"β ms").

The delay generator 13 performs the delay generating according to the output timing delays $T_D0$-$T_D2$ in the same way as the above-mentioned embodiment [1] (at step S4).

Thus, the phases of the SONET frames FR transmitted to the path P1 are shifted from those of the SONET frames FR having been transmitted to the path P0 by "21-α ms", and the phases of the SONET frames FR transmitted to the path P2 are shifted from those of the SONET frames FR having been transmitted to the path P1 by "42-β ms".

The transmission delays of "α ms" and "β ms" respectively occur in the paths P1 and P2 from those states, which results in the phases of the frames FR which the transmission device 1R receives through the paths P0-P2 being shifted by the optimal delay interval D.

VI. Embodiment [6]

FIGS. 17-20

VI.1. Arrangement: FIG. 17

Transmission devices 1S and 1R according to the embodiment [6] of the present invention shown in FIG. 17 are different from those of the above-mentioned embodiment [1] in that a transmission delay notifying portion 14 measuring the transmission delays $T_P$ which occur between the paths P0-P2 to be stored in the SONET frames FR transmitted to the transmission device 1S is provided in the Ethernet interface 10R within the transmission device 1R, and that the reception fault monitor 12 extracts from the frames FR received through each of the paths P0-P2 the transmission delays $T_P$ to be provided to the controller 30S.

Namely, different from the above-mentioned embodiment [5], this embodiment deals with a case where the transmission device 1S can directly recognize the transmission delays $T_P0$-$T_P2$ of the paths P0-P2.

VI.2. Operation Example: FIGS. 18A-20

An operation of this embodiment will now be described. Firstly, embodiments (1) and (2) of the transmission delay notifying portion 14 will be described referring to FIGS. 18A, 18B, 19A, and 19B. Then, an overall operation of the transmission device 1S will be described referring to FIG. 20.

VI.2.A. Embodiment (1) of Transmission Delay Notifying Portion: FIGS. 18A and 18B As shown in FIG. 18A, the transmission delay notifying portion 14 firstly measures the transmission delays $T_P0$-$T_P2$ of the paths P0-P2 (at step R7). Then, the transmission delay notifying portion 14 sets the transmission delays $T_P0$-$T_P2$ measured respectively in F2 bytes in the path overheads of the individual SONET frames FR (at step R8). The F2 byte comprises an 8-bit area which an operator can freely use. The transmission delay notifying portion 14 sets therein the transmission delays $T_P$ by e.g. "0.5 ms" as shown in FIG. 18B.

Then, the transmission delay notifying portion 14 transmits the frames FR where the transmission delays $T_P0$-$T_P2$ are set through the paths P0-P2 (at step R9).

Thus, the transmission device 1S can recognize the transmission delays $T_P0$-$T_P2$ based on the frames FR received through the paths P0-P2.

Thereafter, the transmission delay notifying portion 14 repeatedly executes the above-mentioned steps R7-R9. This is because the transmission delays $T_P0$-$T_P2$ of the paths P0-P2 may fluctuate depending on the communication condition.

VI.2.B. Embodiment (2) of Transmission Delay Notifying Portion: FIGS. 19A and 19B As shown in FIG. 19A, the transmission delay notifying portion 14 firstly measures the transmission delays $T_P0$-$T_P2$ of the paths P0-P2 in the same way as the above-mentioned embodiment (1) (at step R7). Then, different from the above-mentioned embodiment (1), the transmission delay notifying portion 14 sequentially sets the transmission delays $T_P0$-$T_P2$ measured in a F2 byte in a path overhead of a multi-framed SONET frame FR (hereinafter, referred to as multi-framed F2 byte) to be transmitted common to all of the paths P0-P2.

Namely, the transmission delay notifying portion 14 firstly sets the transmission delay $T_P0$ of the path P0 in the multi-framed F2 byte (at step R10).

FIG. 19B shows a setting example of the multi-framed F2 byte. The transmission delay notifying portion 14 sets the path No. PN="0" in data areas of lines where a multi-frame indicator indicates "0100" and "0101" (namely, the "4th" and "5th" lines), and sets the transmission delay $T_P0$ in data areas of the "10th"-"13th" lines. In this example, the setting area of the transmission delay $T_P$ is allocated for 16 bits (twice that of the above-mentioned embodiment (1)), so that a time value with higher resolution than that of the above-mentioned embodiment (1) can be set. Also, as another information, the error detecting code CRC of the frame FR can be set in the multi-framed F2 byte.

Then, the transmission delay notifying portion 14 transmits the frame FR in which the transmission delay $T_P0$ is set through each of the paths P0-P2 (at step R11).

Thus, even when the reception fault has occurred in any one of the paths P0-P2, the transmission device 1S receives the frame FR having common contents through the normal path where no reception fault has occurred, thereby enabling the transmission delay $T_P0$ to be reliably recognized.

Then, the transmission delay notifying portion 14 determines whether or not the transmission of the transmission delays $T_P0$-$T_P2$ of all of the paths P0-P2 has been completed (at step R12). Since only transmission of the transmission delay $T_P0$ has now completed, the transmission delay notifying portion 14 repeatedly executes the above-mentioned steps R10-R12, thereby performing the transmission of the transmission delays $T_P1$ and $T_P2$.

Thereafter, the transmission delay notifying portion 14 repeatedly executes the above-mentioned steps R7 and R10-R12. This is for addressing the fluctuations of the transmission delays $T_P0$-$T_P2$ in the same way as the above-mentioned embodiment (1).

VI.2.C. Overall Operation Example of Transmission Device 1S: FIG. 20

A flowchart shown in FIG. 20 is changed so as to execute step S11 instead of the processing of the steps S8 and S9 shown in FIG. 15 and to repeatedly execute the step S11 as well as the steps S2, S10, and S4.

Namely, different from the above-mentioned embodiment [5], every time the frames FR where the transmission delays $T_P0$-$T_P2$ of the paths P0-P2 are set in the F2 bytes as described in the above-mentioned embodiments (1) and (2) of the transmission delay notifying portion are received from the transmission device 1R (at step S11_1), the reception fault monitor 12 within the transmission device 1S extracts from the F2 bytes the transmission delays $T_P0$-$T_P2$ to be provided to the controller 30S (at step S11_2).

The controller, 30S calculates the output timing delays $T_D0$-$T_D2$ for the paths P0-P2 by using the transmission delays $T_P0$-$T_P2$ in the same way as the above-mentioned embodiment [5] to execute the delay generating.

VII. Embodiment [7]

FIGS. 21-23

VII.1. Arrangement: FIG. 21

Transmission devices 1S and 1R according to the embodiment [7] of the present invention shown in FIG. 21 are different from those of the above-mentioned embodiment [1] in that a loopback processor 15 folding and returning back a loopback control frame FR_LB received from the transmission device 1S is provided in the Ethernet interface 10R within the transmission device 1R.

Namely, different from the above-mentioned embodiment [5], this embodiment deals with a case where the transmission delays $T_P0$-$T_P2$ of the paths P0-P2 are determined based on a round-trip transmission time $T_{TR}\_L$ measured by using the loopback control frame FR_LB.

VII.2. Operation Example: FIGS. 22 and 23

A flowchart shown in FIG. 22 is changed so as to execute step S12 instead of the processing of the step S8 shown in FIG. 15, wherein steps S9_3-S9_5 are substituted for the processing within the step S9.

Namely, at the step S12, round-trip transmission times $T_{TR}\_L0$-$T_{TR}\_L2$ of the paths P0-P2 are measured, and at the step S9, the transmission delays $T_P0$-$T_P2$ of the paths P0-P2 are determined based on the round-trip transmission times $T_{TR}\_L0$-$T_{TR}\_L2$ measured.

The controller 30S within the transmission device 1S firstly provides measurement mode setting instructions INS1 to the frame generator 11, thereby switching the frame generated over to the loopback control frame FR_LB from the SONET frame FR (at step S12_1).

Concurrently, in the controller 30R within the transmission device 1R, loopback control instructions INS3 instructing to fold back the frame FR_LB received are provided to the loopback processor 15.

It is to be noted that triggers in order for the controllers 30S and 30R to output the instructions INS1 and INS3 are respectively provided by e.g. device operations from the operator, or the like.

Then, the controller 30S provides measurement start instructions INS2 to the frame generator 11 and the reception fault monitor 12. The frame generator 11 having received the instructions transmits the frame FR_LB to the transmission device 1R. Also, the reception fault monitor 12 measures the round-trip transmission time $T_{TR\_L}$ of the frame FR_LB for each of the paths P0-P2 (at step S12_2).

When the round-trip transmission times $T_{TR\_L}0$-$T_{TR\_L}2$ of the paths P0-P2 are respectively measured as "2X ms", "2Y ms", and "2Z ms" (supposed that "X<Y<Z" is formed) as shown in FIG. 23, the controller 30S determines transmission times $T_{TR}0$-$T_{TR}2$ of the paths P0-P2 by dividing the round-trip transmission times $T_{TR\_L}0$-$T_{TR\_L}2$ by "2" (at step S9_3).

Then, the controller 30S makes a minimum value within the transmission times $T_{TR}0$-$T_{TR}2$ calculated a minimum transmission time $T_{TR\_}$MIN (at step S9_4), and determines the transmission delays $T_P0$-$T_P2$ of the paths P0-P2 by subtracting the minimum transmission time $T_{TR\_}$MIN from the transmission times $T_{TR}0$-$T_{TR}2$ (at step S9_5).

In this example, the transmission delays $T_P0$, $T_P1$, and $T_P2$ are respectively calculated as "0 ms" ("X ms"-"X ms"), "Y-X ms", and "Z-X ms".

Then, the controller 30S calculates the output timing delays $T_D0$-$T_D2$ for the paths P0-P2 by using the transmission delays $T_P0$-$T_P2$ in the same way as the above-mentioned embodiment [5] to execute the delay generating.

It is to be noted that the present invention is not limited by the above-mentioned embodiments, and it is obvious that various modifications may be made by one skilled in the art based on the recitation of the claims.

What is claimed is:

1. A path status monitoring method, comprising:
cyclically generating frames serially connected for a number equivalent to an operation upper limit number of parallel physical paths, respectively for actually existing physical paths;
shifting phases of the frames between the paths based on the number of the paths;
collecting, when transmitting the frames through each path, statuses where a reception fault has occurred in each path to be stored in a frame predetermined per path among the frames;
generating the frames to be transmitted to each path with the same phases before the cyclically generating; and
delaying, after the generating, the frames sequentially generated in each path to be transmitted until a frame received from a destination of the frames indicates the occurrence of the reception fault, of obtaining a delay upon the occurrence of the reception fault as a transmission delay allowed for the path by the destination, and of obtaining transmission delays of the frames which occur between the paths by subtracting the respective allowable transmission delays from a maximum allowable transmission delay among the allowable transmission delays obtained in all of the paths,
the shifting including shifting the phases of the frames generated at the cyclically generating between the paths by a time interval obtained by equally dividing a circulating cycle of the frames by the number of the paths in ascending order of the transmission delay, and then of restoring the shifts of the respective phases by the respective transmission delays.

2. The path status monitoring method as claimed in claim 1, wherein the shifting and collecting are executed per group into which the paths are divided per predetermined number of paths to transmit frames of same phases between the groups, so that even when the reception fault occurs in one path among one group at a destination of the frames, the destination can receive through any one of the paths among other groups the frame with the same phase as that of the frame transmitted through the one path.

3. The path status monitoring method as claimed in claim 2, wherein the collecting includes assigning to each of the frames per group an order for having the frames processed in order of the transmission to each path at a destination of the frames.

4. The path status monitoring method as claimed in claim 1, wherein the collecting includes assigning to each of the frames an order for having the frames processed in order of the transmission to each path at a destination of the frames.

5. The path status monitoring method as claimed in claim 1, wherein the shifting includes receiving a transmission delay of each path from a destination of the frames, and shifting the phases of the frames between the paths by a time interval obtained by equally dividing a circulating cycle of the frames by the number of the paths in ascending order of the transmission delay, and then of restoring the shifts of the respective phases by the respective transmission delays.

6. The path status monitoring method as claimed in claim 5, wherein each transmission delay is sequentially set in a vacant area in a header of a frame having common contents received through each path, and
the shifting includes a step of shifting, at a normal time, the phases of the frames generated at the cyclically generating by using the transmission delay set in the vacant area in the header of the frame received through one path, and of shifting, when the reception fault occurs in the one path, the phases of the frames generated at the cyclically generating by using the transmission delay set in the vacant area in the header of the frame received through other paths.

7. The path status monitoring method as claimed in claim 1, further comprising,
transmitting a loopback control frame through each path before the cyclically generating, of measuring a round-trip transmission time per path until the loopback control frame is folded and returned back from a destination of the frames, and of obtaining transmission times of the paths from the respective round-trip transmission times.

* * * * *